United States Patent
Ismalon

(10) Patent No.: US 8,438,178 B2
(45) Date of Patent: May 7, 2013

(54) INTERACTIONS AMONG ONLINE DIGITAL IDENTITIES

(75) Inventor: Emil Ismalon, Tel-Aviv (IL)

(73) Assignee: Collarity Inc., Palo Alto, CA (US)

( * ) Notice: Subject to any disclaimer, the term of this patent is extended or adjusted under 35 U.S.C. 154(b) by 523 days.

(21) Appl. No.: 12/491,451

(22) Filed: Jun. 25, 2009

(65) Prior Publication Data
US 2010/0049770 A1    Feb. 25, 2010

Related U.S. Application Data

(60) Provisional application No. 61/133,384, filed on Jun. 26, 2008.

(51) Int. Cl.
G06F 17/30 (2006.01)
G06F 7/00 (2006.01)

(52) U.S. Cl.
USPC ............ 707/765; 707/732; 707/769; 707/803

(58) Field of Classification Search ........................ None
See application file for complete search history.

(56) References Cited

U.S. PATENT DOCUMENTS

| | | | |
|---|---|---|---|
| 4,823,306 A | 4/1989 | Barbic et al. | |
| 4,839,853 A | 6/1989 | Deerwester et al. | |
| 5,301,109 A | 4/1994 | Landauer et al. | |
| 5,325,445 A * | 6/1994 | Herbert | 382/225 |
| 5,619,709 A * | 4/1997 | Caid et al. | 715/209 |
| 5,724,521 A | 3/1998 | Dedrick | |
| 5,754,938 A | 5/1998 | Herz et al. | |
| 5,809,242 A | 9/1998 | Shaw et al. | |
| 5,825,943 A | 10/1998 | DeVito et al. | |
| 5,857,179 A | 1/1999 | Vaithyanathan et al. | |
| 5,864,845 A | 1/1999 | Voorhees et al. | |
| 5,887,133 A | 3/1999 | Brown et al. | |
| 5,926,812 A | 7/1999 | Hilsenrath et al. | |
| 5,948,061 A | 9/1999 | Merriman et al. | |

(Continued)

FOREIGN PATENT DOCUMENTS

| | | |
|---|---|---|
| WO | WO 00/62171 | 10/2000 |
| WO | WO 01/29727 | 4/2001 |
| WO | WO 2006/103616 | 10/2006 |
| WO | WO 2007/124430 | 11/2007 |

OTHER PUBLICATIONS

Ming-Chang Chen, "Mining Progressive User Behavior for E-Commerce Using Virtual Reality Technique," Dec. 2007, A Thesis presented to the Faculty of the Graduate School at the University of Missouri-Columbia, pp. 1-85.*

(Continued)

*Primary Examiner* — Kaveh Abrishamkar
*Assistant Examiner* — James J Wilcox
(74) *Attorney, Agent, or Firm* — Sughrue Mion, PLLC

(57) ABSTRACT

A computer-implemented method is provided, which includes constructing first and second user profiles for respective first and second users, by observing respective online behaviors of the first and second users. The first and second user profiles are projected onto an N-dimensional vector space as respective first and second vectors. An interaction between the first and second vectors in the vector space is modeled. Responsively to the modeled interaction, at least one entity is modified, the entity selected from the group consisting of: the first user profile, and the first vector. Content is presented to the first user responsively to the modified entity. Other embodiments are also described.

39 Claims, 7 Drawing Sheets

U.S. PATENT DOCUMENTS

| | | | |
|---|---|---|---|
| 5,963,724 A | 10/1999 | Mantooth et al. | |
| 5,987,457 A | 11/1999 | Ballard | |
| 6,006,225 A | 12/1999 | Bowman et al. | |
| 6,098,065 A | 8/2000 | Skillen et al. | |
| 6,134,532 A | 10/2000 | Lazarus et al. | |
| 6,137,911 A | 10/2000 | Zhilyaev | |
| 6,167,397 A | 12/2000 | Jacobson et al. | |
| 6,189,002 B1 | 2/2001 | Roitblat | |
| 6,289,353 B1 | 9/2001 | Hazlehurst et al. | |
| 6,308,202 B1 | 10/2001 | Cohn et al. | |
| 6,321,226 B1 | 11/2001 | Garber et al. | |
| 6,327,574 B1 | 12/2001 | Kramer et al. | |
| 6,347,313 B1 | 2/2002 | Ma et al. | |
| 6,356,898 B2 | 3/2002 | Cohen et al. | |
| 6,360,221 B1 | 3/2002 | Gough et al. | |
| 6,366,298 B1 | 4/2002 | Haitsuka et al. | |
| 6,377,961 B1 | 4/2002 | Ryu | |
| 6,385,592 B1 | 5/2002 | Angles et al. | |
| 6,407,748 B1 * | 6/2002 | Xavier | 345/672 |
| 6,411,950 B1 | 6/2002 | Moricz et al. | |
| 6,442,545 B1 * | 8/2002 | Feldman et al. | 1/1 |
| 6,449,657 B2 | 9/2002 | Stanbach, Jr. et al. | |
| 6,449,765 B1 | 9/2002 | Ballard | |
| 6,513,036 B2 | 1/2003 | Fruensgaard et al. | |
| 6,529,903 B2 | 3/2003 | Smith et al. | |
| 6,539,396 B1 | 3/2003 | Bowman-Amuah | |
| 6,581,056 B1 | 6/2003 | Rao | |
| 6,584,492 B1 | 6/2003 | Cezar et al. | |
| 6,611,825 B1 * | 8/2003 | Billheimer et al. | 706/45 |
| 6,615,238 B1 | 9/2003 | Melet et al. | |
| 6,636,848 B1 | 10/2003 | Aridor et al. | |
| 6,647,383 B1 | 11/2003 | August et al. | |
| 6,665,656 B1 | 12/2003 | Carter | |
| 6,665,838 B1 | 12/2003 | Brown et al. | |
| 6,671,681 B1 | 12/2003 | Emens et al. | |
| 6,675,205 B2 | 1/2004 | Meadway et al. | |
| 6,681,223 B1 | 1/2004 | Sundaresan | |
| 6,701,309 B1 | 3/2004 | Beeferman et al. | |
| 6,708,176 B2 | 3/2004 | Strunk et al. | |
| 6,711,577 B1 | 3/2004 | Wong et al. | |
| 6,732,088 B1 | 5/2004 | Glance et al. | |
| 6,772,150 B1 | 8/2004 | Whitman et al. | |
| 6,772,200 B1 | 8/2004 | Bakshi et al. | |
| 6,839,682 B1 * | 1/2005 | Blume et al. | 705/7.31 |
| 6,842,906 B1 | 1/2005 | Bowman-Amuah | |
| 6,874,018 B2 | 3/2005 | Wu | |
| 6,876,997 B1 | 4/2005 | Rorex et al. | |
| 6,892,181 B1 | 5/2005 | Megiddo et al. | |
| 6,892,354 B2 | 5/2005 | Servan-Schreiber et al. | |
| 6,904,408 B1 * | 6/2005 | McCarthy et al. | 705/2 |
| 6,904,588 B2 | 6/2005 | Reddy et al. | |
| 6,917,961 B2 | 7/2005 | Melet et al. | |
| 6,920,448 B2 | 7/2005 | Kincaid et al. | |
| 6,925,460 B2 | 8/2005 | Kummamuru et al. | |
| 6,947,930 B2 | 9/2005 | Anick et al. | |
| 6,978,263 B2 | 12/2005 | Soulanille | |
| 6,983,320 B1 | 1/2006 | Thomas et al. | |
| 7,013,323 B1 | 3/2006 | Thomas et al. | |
| 7,028,072 B1 | 4/2006 | Kliger et al. | |
| 7,065,550 B2 | 6/2006 | Raghunandan | |
| 7,076,497 B2 | 7/2006 | Donteverde | |
| 7,089,237 B2 | 8/2006 | Turnbull et al. | |
| 7,096,218 B2 | 8/2006 | Schrmer et al. | |
| 7,110,993 B2 | 9/2006 | Soulanille et al. | |
| 7,139,755 B2 | 11/2006 | Hammond | |
| 7,152,059 B2 | 12/2006 | Monteverde | |
| 7,152,061 B2 | 12/2006 | Curtis et al. | |
| 7,152,065 B2 | 12/2006 | Behrens et al. | |
| 7,181,438 B1 | 2/2007 | Szabo | |
| 7,233,973 B2 | 6/2007 | Melet et al. | |
| 7,236,969 B1 | 6/2007 | Skillen et al. | |
| 7,249,053 B2 | 7/2007 | Wohlers et al. | |
| 7,257,570 B2 | 8/2007 | Riise et al. | |
| 7,272,638 B2 | 9/2007 | Lee et al. | |
| 7,295,991 B1 | 11/2007 | Clarke et al. | |
| 7,313,556 B2 | 12/2007 | Gallivan et al. | |
| 7,319,975 B2 | 1/2008 | Monteverde | |
| 7,376,709 B1 | 5/2008 | Brei et al. | |
| 7,451,129 B2 | 11/2008 | Lamping et al. | |
| 7,451,130 B2 | 11/2008 | Gupta et al. | |
| 7,464,079 B2 | 12/2008 | Soulanille | |
| 7,469,245 B2 | 12/2008 | Skillen et al. | |
| 7,499,940 B1 | 3/2009 | Gibbs | |
| 7,529,740 B2 | 5/2009 | Chang et al. | |
| 7,539,693 B2 | 5/2009 | Frank et al. | |
| 7,562,074 B2 | 7/2009 | Liddell et al. | |
| 7,565,345 B2 | 7/2009 | Bailey et al. | |
| 7,567,958 B1 | 7/2009 | Alspector et al. | |
| 7,577,718 B2 * | 8/2009 | Slawson et al. | 709/218 |
| 7,593,929 B2 | 9/2009 | Dettinger et al. | |
| 7,596,581 B2 | 9/2009 | Frank et al. | |
| 7,606,798 B2 | 10/2009 | Ge et al. | |
| 7,634,462 B2 | 12/2009 | Weyand et al. | |
| 7,660,737 B1 | 2/2010 | Lim et al. | |
| 7,660,815 B1 | 2/2010 | Scofield et al. | |
| 7,676,462 B2 | 3/2010 | Kirkland et al. | |
| 7,685,192 B1 | 3/2010 | Scofield et al. | |
| 7,739,357 B2 | 6/2010 | Gould | |
| 7,752,326 B2 | 7/2010 | Smit | |
| 7,756,855 B2 | 7/2010 | Ismalon | |
| 7,774,335 B1 | 8/2010 | Scofield et al. | |
| 7,774,339 B2 | 8/2010 | White et al. | |
| 7,774,348 B2 | 8/2010 | Delli Santi et al. | |
| 7,788,252 B2 | 8/2010 | Delli Santi et al. | |
| 7,788,276 B2 | 8/2010 | Peng et al. | |
| 7,792,813 B2 | 9/2010 | Selberg | |
| 7,792,832 B2 | 9/2010 | Poltorak | |
| 7,793,326 B2 | 9/2010 | McCoskey et al. | |
| 7,797,421 B1 | 9/2010 | Scofield et al. | |
| 7,805,339 B2 | 9/2010 | Ashkenazi et al. | |
| 7,805,450 B2 | 9/2010 | Delli Santi et al. | |
| 7,809,721 B2 | 10/2010 | Putivsky et al. | |
| 7,810,119 B2 | 10/2010 | Johnson | |
| 7,813,967 B2 | 10/2010 | Kopelman et al. | |
| 7,814,097 B2 | 10/2010 | Smith et al. | |
| 7,822,774 B2 | 10/2010 | Craswell et al. | |
| 7,831,582 B1 | 11/2010 | Scofield et al. | |
| 7,870,147 B2 | 1/2011 | Bailey et al. | |
| 7,962,479 B2 | 6/2011 | Jones et al. | |
| 8,073,868 B2 | 12/2011 | Lavi | |
| 8,135,729 B2 | 3/2012 | Brewer et al. | |
| 2002/0073088 A1 | 6/2002 | Beckmann et al. | |
| 2002/0078045 A1 | 6/2002 | Dutta | |
| 2002/0100040 A1 | 7/2002 | Bull | |
| 2002/0111994 A1 | 8/2002 | Raghunandan | |
| 2002/0123912 A1 | 9/2002 | Subramanian et al. | |
| 2002/0133483 A1 | 9/2002 | Klenk et al. | |
| 2002/0161747 A1 * | 10/2002 | Li et al. | 707/3 |
| 2002/0169764 A1 | 11/2002 | Kincaid et al. | |
| 2002/0198882 A1 | 12/2002 | Linden et al. | |
| 2003/0058277 A1 | 3/2003 | Bowman-Amuah | |
| 2003/0061206 A1 | 3/2003 | Qian | |
| 2003/0123443 A1 | 7/2003 | Anwar | |
| 2003/0140313 A1 | 7/2003 | Smith | |
| 2003/0220917 A1 | 11/2003 | Copperman et al. | |
| 2004/0010566 A1 | 1/2004 | Monteverde | |
| 2004/0034799 A1 * | 2/2004 | Mikami | 713/201 |
| 2004/0059708 A1 | 3/2004 | Dean et al. | |
| 2004/0073485 A1 | 4/2004 | Liu et al. | |
| 2004/0153472 A1 | 8/2004 | Rieffanaugh | |
| 2004/0158559 A1 | 8/2004 | Poltorak | |
| 2004/0220850 A1 | 11/2004 | Ferrer et al. | |
| 2004/0249709 A1 | 12/2004 | Donovan et al. | |
| 2004/0249809 A1 | 12/2004 | Ramani et al. | |
| 2005/0027691 A1 | 2/2005 | Brin et al. | |
| 2005/0033641 A1 | 2/2005 | Jha et al. | |
| 2005/0033657 A1 | 2/2005 | Herrington et al. | |
| 2005/0055341 A1 | 3/2005 | Haar et al. | |
| 2005/0076003 A1 | 4/2005 | DuBose et al. | |
| 2005/0076097 A1 | 4/2005 | Sullivan et al. | |
| 2005/0086283 A1 | 4/2005 | Marshall | |
| 2005/0091111 A1 | 4/2005 | Green et al. | |
| 2005/0091204 A1 | 4/2005 | Melman | |
| 2005/0108001 A1 | 5/2005 | Aarskog | |
| 2005/0114322 A1 | 5/2005 | Melman | |
| 2005/0114324 A1 | 5/2005 | Mayer | |
| 2005/0131762 A1 | 6/2005 | Bharat et al. | |

| | | |
|---|---|---|
| 2005/0144158 A1 | 6/2005 | Capper et al. |
| 2005/0149494 A1 | 7/2005 | Lindh et al. |
| 2005/0171760 A1 | 8/2005 | Tinkler |
| 2005/0216434 A1 | 9/2005 | Haveliwala et al. |
| 2005/0222989 A1* | 10/2005 | Haveliwala et al. ............... 707/3 |
| 2005/0234881 A1 | 10/2005 | Burago et al. |
| 2006/0047643 A1 | 3/2006 | Chaman |
| 2006/0059134 A1 | 3/2006 | Palmon et al. |
| 2006/0074883 A1 | 4/2006 | Teevan et al. |
| 2006/0115145 A1* | 6/2006 | Bishop et al. ................. 382/155 |
| 2006/0161520 A1 | 7/2006 | Brewer et al. |
| 2006/0161553 A1 | 7/2006 | Woo |
| 2006/0167842 A1 | 7/2006 | Watson |
| 2006/0179051 A1* | 8/2006 | Whitney et al. ................... 707/5 |
| 2006/0184512 A1 | 8/2006 | Kohanim et al. |
| 2006/0218036 A1 | 9/2006 | King et al. |
| 2006/0218146 A1 | 9/2006 | Bitan et al. |
| 2006/0253427 A1 | 11/2006 | Wu et al. |
| 2006/0282328 A1 | 12/2006 | Gerace et al. |
| 2006/0294084 A1 | 12/2006 | Patel et al. |
| 2007/0011154 A1 | 1/2007 | Musgrone et al. |
| 2007/0011668 A1 | 1/2007 | Wholey et al. |
| 2007/0043617 A1 | 2/2007 | Stein et al. |
| 2007/0043688 A1 | 2/2007 | Kountz et al. |
| 2007/0061301 A1* | 3/2007 | Ramer et al. ....................... 707/3 |
| 2007/0073756 A1 | 3/2007 | Manhas et al. |
| 2007/0083506 A1 | 4/2007 | Liddell et al. |
| 2007/0121843 A1 | 5/2007 | Atazky et al. |
| 2007/0162396 A1 | 7/2007 | Goldman et al. |
| 2007/0162422 A1 | 7/2007 | Djabarov |
| 2007/0174255 A1 | 7/2007 | Sravanapudi et al. |
| 2007/0198506 A1 | 8/2007 | Attaran Rezaei et al. |
| 2007/0198526 A1 | 8/2007 | Pitkow |
| 2007/0203929 A1 | 8/2007 | Bollvar |
| 2007/0214123 A1 | 9/2007 | Messer et al. |
| 2007/0226082 A1 | 9/2007 | Leal |
| 2007/0244866 A1 | 10/2007 | Mishkanian et al. |
| 2007/0250500 A1 | 10/2007 | Ismalon |
| 2007/0250511 A1 | 10/2007 | Endler et al. |
| 2007/0265922 A1 | 11/2007 | Dumond et al. |
| 2007/0266019 A1 | 11/2007 | Lavi |
| 2008/0004959 A1 | 1/2008 | Tunguz-Zawislak et al. |
| 2008/0070209 A1 | 3/2008 | Zhuang et al. |
| 2008/0091670 A1 | 4/2008 | Ismalon |
| 2008/0137668 A1 | 6/2008 | Rodriguez et al. |
| 2008/0140643 A1 | 6/2008 | Ismalon |
| 2008/0172363 A1 | 7/2008 | Wang et al. |
| 2008/0172380 A1 | 7/2008 | Czyz et al. |
| 2008/0215416 A1 | 9/2008 | Ismalon |
| 2008/0275861 A1 | 11/2008 | Baluja et al. |
| 2008/0288596 A1 | 11/2008 | Smith et al. |
| 2008/0300937 A1* | 12/2008 | Allen et al. ........................ 705/7 |
| 2009/0119261 A1 | 5/2009 | Ismalon |
| 2009/0228296 A1 | 9/2009 | Ismalon |

OTHER PUBLICATIONS

"Searchable Banners: The Next Wave for Online Databases" (Borrell Associates Inc., Nov. 2005).
David Berkowitz, "Banner Ads: The New Search Engine", SearchINSIDER (Dec. 6, 2005).
http://developers.evrsoft.com/forum/showthread.php?t=2039, Oct. 2003.
Ubiquitous Advertising on the Merging Advertisement on the Browser. Youji Kohda and Susumu Endo. Fifth International World Wide Web Conference. (May 6-10, 1996).
Unintrusive Customization Techniques for Web Advertising. Marc Langheinrich et al. Computer Networks. vol. 31, No. 11-16, pp. 1259-1272. (Published 1999).
Recommending from Content: Preliminary Results from an E-Commerce Experiment, Mark Rosenstein and Carol Lochbaum. CHI 2000 published Apr. 1-6, 2000, The Hague, The Netherlands.
J. Matthews, "Automating Ad Intelligence," SiliconValley, downloaded from siliconvalley.internet.com/news/article.php/3531.sub.—, (Jun. 20, 2000) 4 pgs.
An Office Action dated Nov. 26, 2008, which issued during the prosecution of Applicant's U.S. Appl. No. 11/633,461.
An Office Action dated Jul. 21, 2009, which issued during the prosecution of Applicant's U.S. Appl. No. 11/633,461.
An Office Action dated Nov. 3, 2009, which issued during the prosecution of Applicant's U.S. Appl. No. 11/846,213.
International Preliminary Report on Patentability (IPRP) dated Oct. 30, 2008, which issued during the prosecution of Applicant's PCT/US2007/067103.
Gawroński P et al., in "The Heider balance and social distance," Acta Physica Polonica B 36(8):2549-2558 (2005).
Axelrod R, in "The dissemination of culture: a model with local convergence and global polarization," J Conflict Res 41(2):203-226 (1997).
Hofmann T, "Probabilistic latent semantic indexing," Proceedings of the Twenty-Second Annual International SIGIR Conference (1999).
Blei D et al., "Latent Dirichlet allocation," Journal of Machine Learning Research 3 (2003).
Griffiths T et al., "Finding Scientific Topics," Proceedings of the National Academy of Sciences 101 (suppl. 1): 5228-5235 (2004).
Steyvers M et al., "Probabilistic topic models." In Landauer T et al. (eds), *Latent Semantic Analysis: A Road to Meaning* (2007).
Dhillon I et al., "A Unified View of Kernel k-means ,Spectral Clustering and Graph Cuts," UTCS Technical Report #TR-04-25 (Feb. 18, 2005).
Grady L et al., "Isoperimetric Graph Partitioning for Data Clustering and Image Segmentation," IEEE Transactions on Pattern Analysis and Machine Intelligence (2004).
Jan Pedersen, et al., "Snippet Search: a single phrase approach to text access", Proceedings of the 1991 Joint Statistical Meeting.
Guy Shani, et al., Establishing User Profiles in MediaScout recommender system, 2007 (Affinity).
Pamela Parker, ClickZ, Interactive Ads play Big Role in "Miniority Report" Jun. 12, 2002 (InteractiveAd).
Internet Archives, www.waybackmachine-www.cnn.com (CNN2005).
An Office Action dated Nov. 10, 2010, which issued during the prosecution of Applicant's U.S. Appl. No. 12/023,564.
An Office Action dated Mar. 31, 2011 which issued during the prosecution of U.S. Appl. No. 12/397,510.
An Office Action dated Jul. 11, 2011 which issued during the prosecution of U.S. Appl. No. 12/023,564.
Ye et al. Towards lightweight application integration based on mashup, 2009 Congress on Services—1.
Bakshi and Karger Semantic web applications, 2005.
Jansenand McNeese Evaluating the effectiveness of and patterns of interactions pp. 1480-1503, 2005.
Beeferman and Berger Agglomerative clustering of a search engine query log , pp. 407-416, 2000.
Storey et al. The role of user profiles in context aware query processing, pp. 51-63, 2004.
Birman et al. Building collaboration applications, 2009 IEEE International Conference on Web services.
Sahami and Heilman A web based kernel function for matching short text snippets, pp. 2-9, 2005.
FLUIT Autofocus semantic search for the desktop, 2005 IEEE.
Li et al. A new approach to query expansion, pp. 2302-2306, Aug. 2005.
Woolston, Pro Ajax and the NET 2 0 Platform, 2006.
Sugiyama et al. Adaptive Web Search Based on User Profile Constructed Without Any Effort from Users, 2004.
Valentine, Google Suggest Tool Beta-Amazing, Dec. 2004.
Gretzel and Wober, Intelligent search support ISBN 3-211-20669-8, 2004.
Joshi and Motwani Keyword generation for search engine advertising, ISBN 0/7695-2702-7 pp. 490-496, 2006.
Lu et al. Extending a Web Browser with Client-Side Mining, pp. 166-177, 2003.
Oliveira et al. Interactive Query Expansion in a Meta-search Engine, pp. 50-57, 1999.
Smeaton Relevance Feedback and Query Expansion for Searching the Web a Model for Searching a Digital Library, ISBN 3-540-63554-8, Sep. 1997.
Sunayama et al. Refining search expression by discovering hidden users interests, pp. 186-197, 1998.

Anick, Using terminological feedback for websearch, pp. 88-95, 2003.
Chen et al. Internet browsing and searching, pp. 582-603, 1998.
Dzeng and Chang Learning search keywords for search procurement, 2004.
Huang et al. Relevant term suggestion, pp. 638-649, 2003.
Jones et al. Generating query substitutions, 2006.
Lovic et al. Enhancing search engine performance using expert systems, 2006 IEEE.
Scholer and Williams Query association for effective retrieval, pp. 324-331, 2002.
Stenmark To search is great, Oct. 1997.
Cooper and Byrd Obiwan A Visual Interface for Prompted Query Refinement, 1998 IEEE.
Glance Community Search Assistant, pp. 91-96, 2001.
An Office Action dated Dec. 1, 2011 which issued during the prosecution of U.S. Appl. No. 12/397,510.
An Office Action dated Jun. 13, 2011 which issued during the prosecution of U.S. Appl. No. 12/253,087?
A final Office Action dated Mar. 5, 2012 which issued during the prosecution of U.S. Appl. No. 12/253,087.
An office action issued in U.S. Appl. No. 12/397,510 dated Dec. 28, 2012?.

Anick P, "Interactive Document Retrieval using Faceted Terminological Feedback," HICSS 2:2036 (1999).
Gauch S et al., "An Expert System for Automatic Query Reformulation" (1993).
Gauch S et al., "A Corpus Analysis Approach for Automatic Query Expansion and Its Extension to Multiple Databases," ACM Transactions on Information System, vol. 17, No. 3, pp. 250-269 (Jul. 1999).
Koutrika G, "A Unified User Profile Framework for Query Disambiguation and Personalization," PIA 2005: 44-53 (Jul. 24-25, 2005).
Hoeber O et al., "Visualization Support for Interactive Query Refinement," Department of Computer Science, University of Regina, Regina, Saskatchewan, Canada (Sep. 2005).
Mena E et al., "Observer: An Approach for Query Processing in Global Information Systems Based on Interoperation Across Pre-Existing Ontologies," Distributed and Parallel Databases, 8, 233-271 (Apr. 2000).
Smyth B et al., "Exploiting Query Repetition and Regularity in an Adaptive Community-Based Wed Search Engine," User Modeling and User-Adapted Interaction 14:383-423 (2004).

* cited by examiner

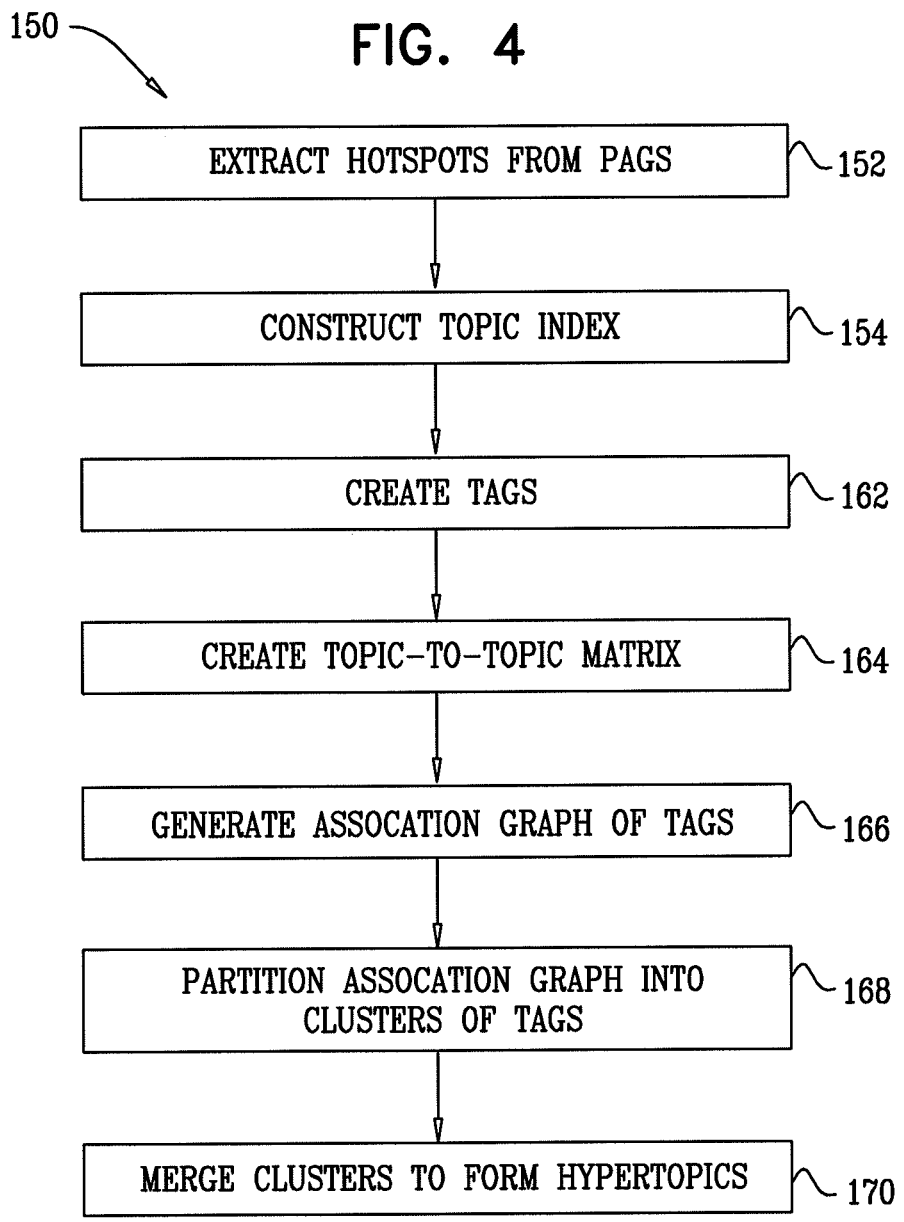

FIG. 5A

| PRIMARY INDEX | SECONDARY INDEX | USER ID | ASSOCIATION SCORE | DEGREE | URL ID(S) |
|---|---|---|---|---|---|
| FINANCE | MONEY | 001 | 70 | 1 | 24,26,123 |
| | | 002 | 80 | 1 | 25,27,123 |
| | | 004 | 100 | 1 | 140,190,400 |
| FINANCE | STOCK | 003 | 75 | 1 | 140,20,420 |
| | | 005 | 80 | 1 | 135,500,312 |
| | | 001 | 90 | 1 | 130,523,300 |
| | | 002 | 120 | 1 | 24,800,673 |
| FINANCE | RESEARCH | 001 | 80 | 1 | 415,715,716 |
| | | 003 | 110 | 1 | 416,715,843 |
| FINANCE | DOLLAR | 002 | 80 | 1 | 100,120,905 |
| | | 005 | 90 | 1 | 111,135,906 |
| | | 008 | 110 | 1 | 112,176,5 |
| | | 009 | 150 | 1 | 112,177,920 |
| MEDICINE | HEART | 010 | 80 | 1 | 43,50,116 |
| | | 013 | 90 | 1 | 42,50,999 |
| | | 012 | 95 | 1 | 905,55,124 |
| MEDICINE | CARDIOLOGY | 014 | 100 | 1 | 110,87,12 |
| | | 012 | 105 | 1 | 19,104,12 |
| | | 010 | 110 | 1 | 18,550,113 |

FIG. 5B

| PRIMARY INDEX | SECONDARY INDEX | USER ID | ASSOCIATION SCORE | DEGREE | URL ID(S) |
|---|---|---|---|---|---|
| FINANCE+ MONEY | | 001 | 70 | | |
| | | 002 | 80 | | |
| | | 003 | 100 | | |

INTERACTIONS AMONG ONLINE DIGITAL IDENTITIES

CROSS-REFERENCE TO RELATED APPLICATIONS

The present application claims the benefit of U.S. Provisional Application 61/133,384, filed Jun. 26, 2008, entitled, "Interactions among online digital identities," which is assigned to the assignee of the present application and is incorporated herein by reference.

FIELD OF THE INVENTION

The present invention relates generally to online services, and specifically to community-based online services.

BACKGROUND OF THE INVENTION

Internet search engines have become fundamental tools for nearly all users seeking information and sites on the World Wide Web (WWW). Users can find vast amounts of data and select the data that appears to best match specific search criteria. Free-text searches are generally performed by providing a search phrase including one or more keywords, and optionally Boolean operators. The most widely used free-text search engines currently are provided by Google, Inc. and Yahoo, Inc. Most large websites offer site-specific search tools for finding content on the webpages of the website.

Based on the search phrase provided by a user, a search engine generally returns a list of documents from which the user selects those that appear most relevant. The list typically includes a snippet from each of documents that includes one or more of the keywords, and the URL of the document. Typically, the search engine presents the list of documents in descending order according to general, static criteria established by the search engine provider. Numerous techniques have been developed for ranking the list in order to provide the results most likely to be relevant to a typical user. Some of these techniques take into account the order of the keywords provided by the user.

Such static ranking systems often present high-ranking results that do not match the interests or skills of the searcher, or that do not provide results that correctly reflect the intended meaning of keywords having more than one meaning. For example, a software engineer looking for Java (i.e., software) and a traveler looking for Java (i.e., the island) receive the same results for a query that includes the same keywords, even though their searches had different intended meanings.

Some search engines, such as the one provided by AOL, Inc., attempt to overcome this drawback by using user profiles that specify certain static characteristics of each user. Such characteristics may include information such as the searcher's age, location, job, and education. Each user must provide this information and keep it updated as the user's interests change over time. Such information often does not accurately reflect the user's skill levels in various interest areas. Such profiles also generally fail to adequately reflect the full diversity of the user's interests.

Some search engines are configured to rank results of multi-keyword searches using merge algorithms. For example, the search engine may use criteria to separately rank the results for each of the keywords searched separately, and merge the separate rankings to produce a list of search results containing all of the keywords. Some search engines use collaborative filtering based on social networks, forums, communities, or other types of groups, in an attempt to supply more relevant search results.

Internet advertisements are often targeted to website visitors. Some search engines use search queries to target advertisements to search engine users on the search results pages. For example, Google's AdWord program performs such targeting.

Internet advertisements are often presented on a webpage in the form of banner ads that comprise rectangular boxes including graphical components. When a visitor to a website selects one of these banner ads by clicking on it, embedded hypertext links typically direct the viewer to the advertiser's website. This selection process is referred to as "click-through." The "click-through rate" of an ad is the ratio of the number of click-throughs to the number of impressions of the ad, i.e., the number of times an ad is viewed.

Internet advertisements are increasingly presented on or via a webpage in the form of widgets, which comprise portable pieces of code that can be installed and executed within a webpage or otherwise on a user's personal computer. Widget ads are often interactive, and present dynamic content provided by the advertiser. For example, Google's AdSense uses widgets (referred to as "gadgets") as one vehicle for distributing advertisements.

International Publication WO 07/124,430 to Ismalon, which is assigned to the assignee of the present application and is incorporated herein by reference, describes a method including presenting to a user a range of levels of personalization of search results, including a personalized level, a global level that is not personalized, and a community level between the personalized level and the global level. An indication of a desired one of the levels, and a search query consisting of one or more query terms, are received from the user. Responsively to the search query, a search result listing is generated. At least a portion of the search result listing is ranked at least in part responsively to the indication, and at least a portion of the ranked search result listing is presented to the user.

U.S. Pat. No. 4,839,853 to Deerwester et al., which is incorporated herein by reference, describes a methodology for retrieving textual data objects. The information is treated in the statistical domain by presuming that there is an underlying, latent semantic structure in the usage of words in the data objects. Estimates to this latent structure are utilized to represent and retrieve objects. A user query is recouched in the new statistical domain and then processed in the computer system to extract the underlying meaning to respond to the query.

U.S. Pat. No. 5,754,938 to Herz et al., which is incorporated herein by reference, describes the customized electronic identification of desirable objects, such as news articles, in an electronic media environment. A system automatically constructs both a "target profile" for each target object in the electronic media based, for example, on the frequency with which each word appears in an article relative to its overall frequency of use in all articles, as well as a "target profile interest summary" for each user, which target profile interest summary describes the user's interest level in various types of target objects. The system then evaluates the target profiles against the users' target profile interest summaries to generate a user-customized rank ordered listing of target objects most likely to be of interest to each user so that the user can select from among these potentially relevant target objects, which were automatically selected by this system from the plethora of target objects that are profiled on the electronic media. Users' target profile interest summaries are used to efficiently organize the distribution of information in a large scale system consisting of many users interconnected by means of a communication network. Additionally, a cryptographically-based pseudonym proxy server is provided to ensure the privacy of a user's target profile interest summary, by giving the user control over the ability of third parties to access this summary and to identify or contact the user.

U.S. Pat. No. 7,313,556 to Gallivan et al., which is incorporated herein by reference, describes techniques for dynamically evaluating latent concepts in unstructured documents is disclosed. A multiplicity of concepts are extracted from a set of unstructured documents into a lexicon. The lexicon uniquely identifies each concept and a frequency of occurrence. A frequency of occurrence representation is created for the documents set. The frequency representation provides an ordered corpus of the frequencies of occurrence of each concept. A subset of concepts is selected from the frequency of occurrence representation filtered against a predefined threshold. A group of weighted clusters of concepts selected from the concepts subset is generated. A matrix of best fit approximations is determined for each document weighted against each group of weighted clusters of concepts.

U.S. Pat. No. 7,152,065 to Behrens et al., which is incorporated herein by reference, describes adapting latent semantic indexing (LSI) for information retrieval and text mining operations to work on large heterogeneous data sets by first partitioning the data set into a number of smaller partitions having similar concept domains. A similarity graph network is generated in order to expose links between concept domains which are then exploited in determining which domains to query as well as in expanding the query vector. LSI is performed on those partitioned data sets most likely to contain information related to the user query or text mining operation. In this manner LSI can be applied to datasets that heretofore presented scalability problems. Additionally, the computation of the singular value decomposition of the term-by-document matrix can be accomplished at various distributed computers increasing the robustness of the retrieval and text mining system while decreasing search times.

U.S. Pat. No. 6,137,911 to Zhilyaev, which is incorporated herein by reference, describes a method for classifying documents into one or more clusters corresponding to predefined classification categories by building a knowledge base comprising matrices of vectors which indicate the significance of terms within a corpus of text formed by the documents and classified in the knowledge base to each cluster. The significance of terms is determined assuming a standard normal probability distribution, and terms are determined to be significant to a cluster if their probability of occurrence being due to chance is low. For each cluster, statistical signatures comprising sums of weighted products and intersections of cluster terms to corpus terms are generated and used as discriminators for classifying documents. The knowledge base is built using prefix and suffix lexical rules which are context-sensitive and applied selectively to improve the accuracy and precision of classification.

US Patent Application Publication 20040220850 to Ferrer et al., which is incorporated herein by reference, describes a method for facilitating viral marketing, in which a plurality of computer users communicate via a set of interconnected terminals and share online experiences under the direction of a single user. A plurality of terminals, each having a user interface, connect to a server or network through a portal rather than directly to the server. One terminal serves as a leader terminal. Each terminal connects to the portal so that it can send and receive data and commands between each of the plurality of terminals and the portal through the portal. The portal then connects to a server using a telecommunications connection. The server has the informational content resident thereon desired by the user and presents marketing messages (or other messages) to each of the users. The reactions of the users are recorded, with the recorded information used to identify when a leader of a group is also leading purchasing behavior for the group.

US Patent Application Publication 2004/0059708 to Dean et al., which is incorporated herein by reference, describes techniques for improving the relevance of advertisements to a user's interests. In one implementation, the content of a web page is analyzed to determine a list of one or more topics associated with that web page. An advertisement is considered to be relevant to that web page if it is associated with keywords belonging to the list of one or more topics. One or more of these relevant advertisements may be provided for rendering in conjunction with the web page or related web pages.

US Patent Application Publication 2005/0091111 to Green et al., which is incorporated herein by reference, describes a method of interactive advertising for the Internet, in which a commercial link for an ad space is embedded in the text of a Web page. The contextual targeting for the page is determined by analyzing the overall content of the page or determining the presence of individual keywords within the text content of the page. A keyword that is visually distinguished from the surrounding page content triggers an ad space to display a message, which may include a product related to the text. In some embodiments, the ad space allows a user to make a purchase transaction or view an inventory of goods and services, with descriptions, all without leaving the Web page. The web page is analyzed to determine appropriate keywords within the text to associate with the ad space. Upon user interaction with the keyword, an ad space according to the invention provides a customized message that is contextually targeted to the user.

Gawronski P et al., in "The Heider balance and social distance," Acta Physica Polonica B 36(8):2549-2558 (2005), which is incorporated herein by reference, explore the Heider balance, which is a state of a group of people with established mutual relations between them. These relations, friendly or hostile, can be measured in the Bogardus scale of social distance. The authors examine the influence of allowed ranges for these relations on system dynamics.

Axelrod R, in "The dissemination of culture: a model with local convergence and global polarization," J Conflict Res 41(2):203-226 (1997), which is incorporated herein by reference, describes an agent-based adaptive model of social influence that reveals the effects of a mechanism of convergent social influence. The model is described as illustrating how local convergence can generate global polarization.

The following references, all of which are incorporated herein by reference, may be of interest:

US Patent Application Publication 2005/0033641 to Jha et al.

PCT Publication WO 06/103616 to Pitchers

U.S. Pat. No. 5,987,457 to Ballard

US Patent Application Publication 2005/0076003 to DuBose et al.

U.S. Pat. No. 6,732,088 to Glance

U.S. Pat. No. 6,772,150 to Whitman et al.

US Patent Application Publication 2003/0123443 to Anwar

U.S. Pat. No. 6,636,848 to Aridor et al.

U.S. Pat. No. 4,823,306 to Barbic et al.

U.S. Pat. No. 6,513,036 to Fruensgaard et al.

US Patent Application Publication 2002/0133483 to Klenk et al.

U.S. Pat. No. 5,926,812 to Hilsenrath et al.

U.S. Pat. No. 6,289,353 to Hazlehurst et al.

US Patent Application Publication 2005/0055341 to Haahr et al.

U.S. Pat. No. 6,363,379 to Jacobson et al.

U.S. Pat. No. 6,347,313 to Ma et al.

U.S. Pat. No. 6,321,226 to Garber et al.

U.S. Pat. No. 6,189,002 to Roitblat

U.S. Pat. No. 6,167,397 to Jacobson et al.

U.S. Pat. No. 5,864,845 to Voorhees et al.

U.S. Pat. No. 5,825,943 to DeVito et al.

US Patent Application Publication 2005/0144158 to Capper et al.

US Patent Application Publication 2005/0114324 to Mayer

US Patent Application Publication 2005/0055341 to Haahr et al.

U.S. Pat. No. 5,857,179 to Vaithyanathan et al.

U.S. Pat. No. 7,139,755 to Hammond

U.S. Pat. No. 7,152,061 to Curtis et al.

U.S. Pat. No. 6,904,588 to Reddy et al.

U.S. Pat. No. 6,842,906 to Bowman-Amuha

U.S. Pat. No. 6,539,396 to Bowman-Amuha

US Patent Application Publication 2004/0249809 to Ramani et al.

US Patent Application Publication 2003/0058277 to Bowman-Amuha

U.S. Pat. No. 6,925,460 to Kummamuru et al.

U.S. Pat. No. 6,920,448 to Kincaid et al.

US Patent Application Publication 2006/0074883 to Teevan et al.

US Patent Application Publication 2006/0059134 to Palmon et al.

US Patent Application Publication 2006/0047643 to Chaman

US Patent Application Publication 2005/0216434 to Haveliwala et al.

US Patent Application Publication 2003/0061206 to Qian

US Patent Application Publication 2002/0073088 to Beckmann et al.

US Patent Application Publication 2005/0086283 to Marshall

U.S. Pat. No. 7,249,053 to Wohlers et al.

US Patent Application Publication 2007/0265922 to Dumond et al.

International Application WO 00/62171 to Glazer

International Application WO 01/29727 to Green et al.

U.S. Pat. Nos. 6,615,238, 6,917,961, and 7,233,973 to Melet et al.

US Patent Application Publication 2007/0226082 to Leal

US Patent Application Publication 2006/0218036 to King et al.

A whitepaper entitled, "Searchable Banners: The Next Wave for Online Databases" (Borrell Associates Inc., November 2005)

Berkowitz, David, "Banner Ads: The New Search Engine," SearchINSIDER (Dec. 6, 2005)

Hofmann T, "Probabilistic latent semantic indexing," Proceedings of the Twenty-Second Annual International SIGIR Conference (1999)

Blei D et al., "Latent Dirichlet allocation," Journal of Machine Learning Research 3 (2003)

Griffiths T et al., "Finding Scientific Topics," Proceedings of the National Academy of Sciences 101 (suppl. 1):5228-5235 (2004)

Steyvers M et al., "Probabilistic topic models." In Landauer T et al. (eds), *Latent Semantic Analysis: A Road to Meaning* (2007)

Dhillon I et al., "A Unified View of Kernel k-means, Spectral Clustering and Graph Cuts," UTCS Technical Report #TR-04-25 (Feb. 18, 2005)

Grady L et al., "Isoperimetric Graph Partitioning for Data Clustering and Image Segmentation," IEEE Transactions On Pattern Analysis And Machine Intelligence (2004)

SUMMARY OF THE INVENTION

Embodiments of the present invention provide techniques for modeling interactions of online digital identities of users in order to increase the relevancy of content delivered to the users. A system projects online profiles of the users onto an N-dimensional vector space as respective vectors. The system models informational interactions between pairs of the vectors in proximity to one another, and modifies the associated user profiles based on the interactions, thereby discovering and importing interests from potentially likeminded users nearby in the vector space. The modification of the user profiles increases the relevancy of content subsequently delivered to the users responsively to their profiles.

In some embodiments of the present invention, in order to project the user profiles onto the vector space, the system identifies a set of topics that characterize one or more of the user profiles. The system uses the topics as coordinates of the vector space when projecting the user profiles onto the space. Each of the vectors represents the strength of the user's interests in the topics. The vectors of users having similar interests are thus projected onto the vector space in proximity to one another, and are more likely to interact with one another than the vectors of users having less similar interests. Such interactions enable the propagation of user profiles in the vector space, leading to the grouping of similar users and the divergence of differing users.

In some embodiments of the present invention, the user profiles are represented as personal association graphs (PAGs) including terms as vertices.

There is therefore provided, in accordance with an embodiment of the present invention, a computer-implemented method including:

constructing first and second user profiles for respective first and second users, by observing respective online behaviors of the first and second users;

projecting the first and second user profiles onto an N-dimensional vector space as respective first and second vectors;

modeling an interaction between the first and second vectors in the vector space;

responsively to the modeled interaction, modifying at least one entity selected from the group consisting of: the first user profile, and the first vector; and presenting content to the first user responsively to the modified entity.

In an embodiment, modifying the at least one entity includes modifying the first user profile, and presenting the content includes presenting the content responsively to the modified first user profile. For some applications, modifying the first user profile includes transferring information from the second user profile to the first user profile. For some applications, modifying includes modifying both the first user profile and the second user profile responsively to the modeled interaction.

In an embodiment, modifying the at least one entity includes modifying the first vector, and presenting the content includes presenting the content responsively to the modified first vector. For some applications, modifying the first vector includes moving the first vector closer to the second vector in the vector space. For some applications, modifying includes modifying both the first vector and the second vector responsively to the modeled interaction.

In an embodiment, projecting includes identifying one or more topics, and using the topics as coordinates of the vector space, and the first and second vectors represent respective strengths of interest of the first and second users in the topics. For some applications, the one or more topics are represented as respective topic association graphs (TAGs), each of which includes a plurality of vertices, each of which vertices is linked to one or more other vertices by respective edges.

For some applications, modeling the interaction includes defining a sphere of influence for the second user, and modifying includes modifying the at least one entity only upon finding that the first user falls within the sphere of influence of the second user.

For some applications, modeling the interaction includes probabilistically modeling the interaction between the first and second vectors.

In an embodiment, presenting the content includes presenting search results to the first user responsively to the modified entity and a search query received from the first user. Alternatively or additionally, presenting the content includes presenting an online advertisement to the first user responsively to the modified entity.

For some applications, the first and second user profiles are represented as respective personal association graphs (PAGs), each of which includes a plurality of vertices, each of which vertices is linked to one or more of the other vertices by respective edges.

There is further provided, in accordance with an embodiment of the present invention, apparatus including:

an interface; and a processor, configured to construct first and second user profiles for respective first and second users, by observing, via the interface, respective online behaviors of the first and second users, to project the first and second user profiles onto an N-dimensional vector space as respective first and second vectors, to model an interaction between the first and second vectors in the vector space, to modify, responsively to the modeled interaction, at least one entity selected from the group consisting of: the first user profile, and the first vector, and to present, via the interface, content to the first user responsively to the modified entity.

There is still further provided, in accordance with an embodiment of the present invention, a computer software product, including a tangible computer-readable medium in which program instructions are stored, which instructions, when read by a computer, cause the computer to construct first and second user profiles for respective first and second users, by observing respective online behaviors of the first and second users, to project the first and second user profiles onto an N-dimensional vector space as respective first and second vectors, to model an interaction between the first and second vectors in the vector space, to modify, responsively to the modeled interaction, at least one entity selected from the group consisting of: the first user profile, and the first vector, and to present content to the first user responsively to the modified entity.

The present invention will be more fully understood from the following detailed description of embodiments thereof, taken together with the drawings, in which:

BRIEF DESCRIPTION OF THE DRAWINGS

FIG. 4 is a flowchart schematically illustrating a method for identifying topics, in accordance with an embodiment of the present invention;

FIGS. 5A-B show an exemplary topic index, in accordance with an embodiment of the present invention;

DETAILED DESCRIPTION OF EMBODIMENTS

Figure 1:
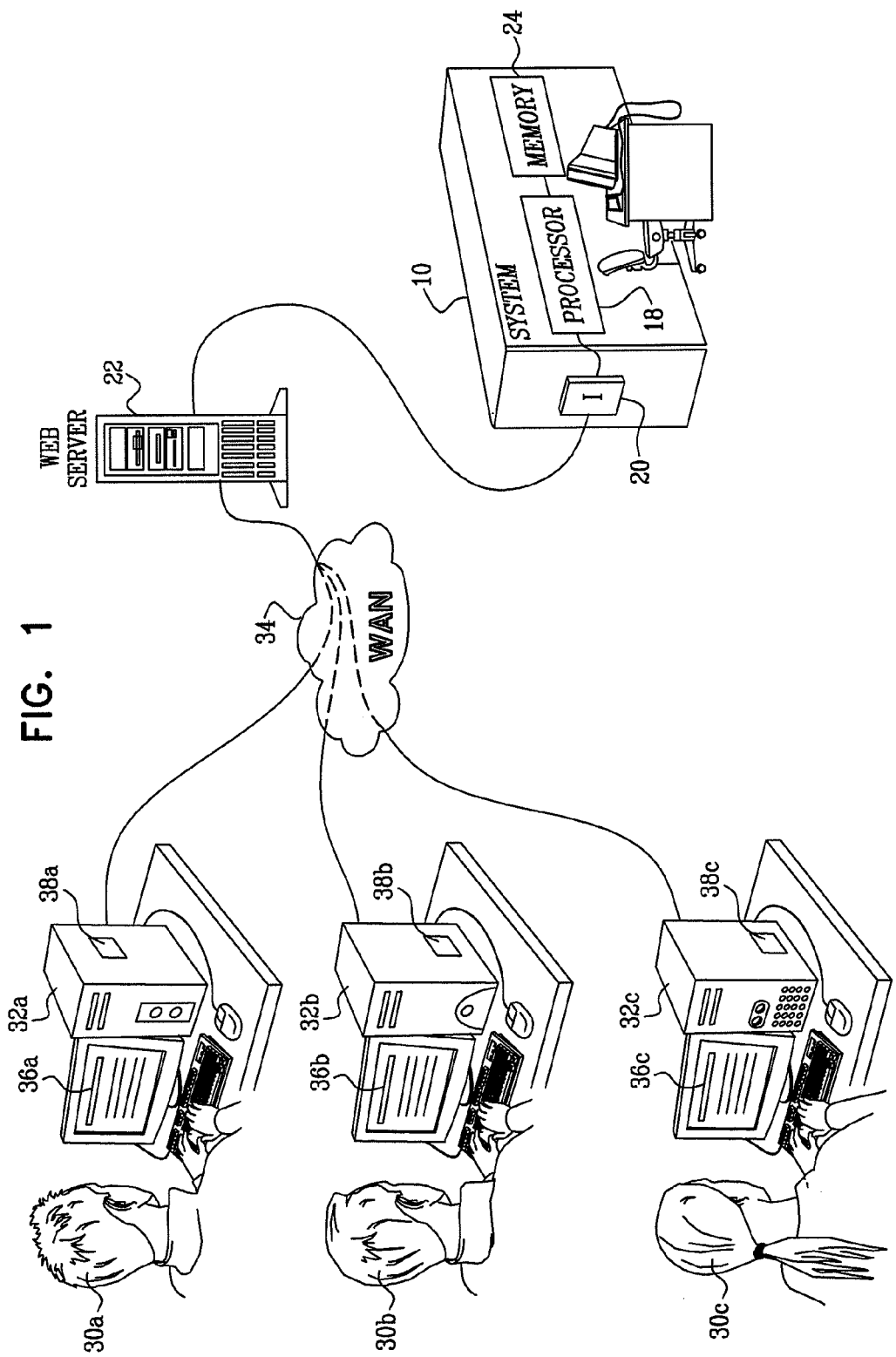
FIG. 1 is a schematic, pictorial illustration of a system for modeling interactions of online digital identities, in accordance with an embodiment of the present invention.

FIG. 1 is a schematic, pictorial illustration of a system 10 for modeling interactions of online digital identities, in accordance with an embodiment of the present invention. System 10 comprises a processor 18, an interface 20, and a memory 24. Typically, system 10 comprises one or more standard computer servers with appropriate memory, communication interfaces and software for carrying out the functions prescribed by the present invention. This software may be downloaded to the system in electronic form over a network, for example, or it may alternatively be supplied on tangible media, such as CD-ROM. Memory 24 comprises a non-volatile memory, such as one or more hard disk drives, and/or a volatile memory, such as random-access memory (RAM).

A plurality of users 30 use respective workstations 32, such as a personal computers, to remotely access system 10 via a wide-area network (WAN) 34, such as the Internet. Alternatively, one or more of users 30 access system 10 via a local area network (LAN), or both a LAN and WAN 34. Typically, a web browser 36 running on each workstation 32 communicates with a web server 22 that is coupled to interface 20 of system 10. Each of workstations 32 comprises a central processing unit (CPU), system memory, a non-volatile memory such as a hard disk drive, a display, input and output means such as a keyboard and a mouse, and a network interface card (NIC). Alternatively, instead of workstations, the users use other devices, such as portable and/or wireless devices, to access the servers.

For some applications, system 10 uses techniques described in International Patent Application PCT/U.S. Ser. No. 07/67,103, which published as PCT Publication WO 07/124,430, and/or U.S. patent application Ser. No. 12/253,087, filed Oct. 16, 2008, which are assigned to the assignee of the present application and are incorporated herein by reference, and/or in the other applications incorporated by reference hereinbelow.

Figure 2:
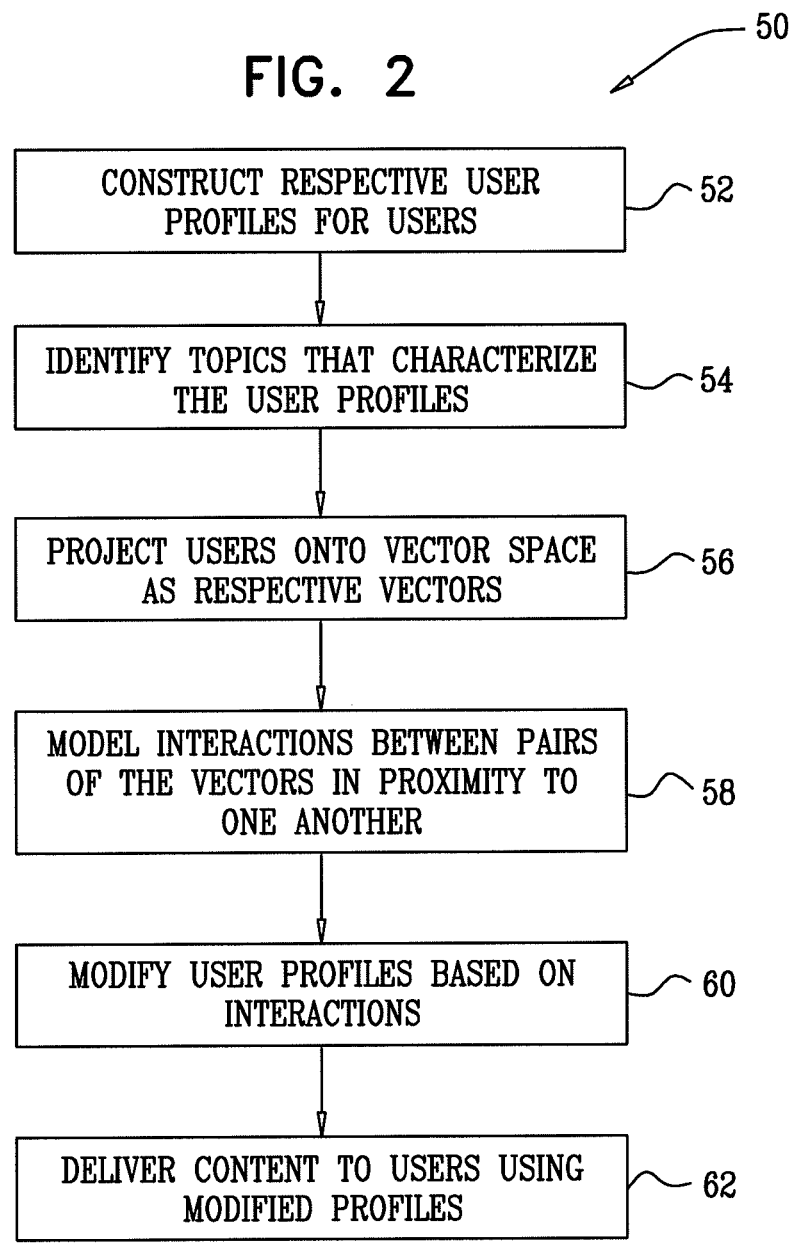
FIG. 2 is a flowchart schematically illustrating a method for modeling interactions of online digital identities of users in order to increase the relevancy of content delivered to the users, in accordance with an embodiment of the present invention.

Reference is made to FIG. 2, which is a flowchart schematically illustrating a method 50 for modeling interactions of online digital identities of users in order to increase the relevancy of content delivered to the users, in accordance with an embodiment of the present invention. At a user profile construction step 52 of method 50, system 10 constructs respective user profiles for users 30, by observing respective online behaviors of the users, such as using the techniques described in above-mentioned PCT Publication WO 07/124, 430, U.S. patent application Ser. No. 12/253,087, and/or in the other applications incorporated by reference hereinbelow.

The respective online behaviors of the users may include interactions of the users with online content. For example, such interactions may include the selection of a search result document from a set of search results presented to the user in response to a search query, such as described hereinbelow. Alternatively or additionally, such interactions may include viewing the content (e.g., reading textual content, viewing video content, or listening to audio content). To construct a profile by observing online behavior, information associated with the content may be transferred to the profile. For example, such information may include words or terms associated with the content, such as words or terms that characterize the content (e.g., determined using latent semantic indexing (LSI), a latent Dirichlet allocation (LDA), and/or a bag of words), or words or terms of topics that characterize the content, for example determined using topic identification techniques described hereinbelow with reference to topic identification step 54 of method 50. Further alternatively or additionally, such interactions of the users with online content may include the user's selecting content or a webpage by clicking on a hyperlink. For some applications, the content includes an advertisement, which, optionally, includes an advertisement profile, information of which is transferred to the user's profile (e.g., using techniques described in U.S. patent application Ser. No. 12/023,564, filed Jan. 31, 2008, entitled, "Searchable interactive internet advertisements," which is incorporated herein by reference).

At a topic identification step 54, system 10 identifies a set of topics that characterize one or more of the user profiles. Typically, each topic comprises a set of one or more words. For some applications, each topic comprises an association graph, such as a merged association graph of one or more topic association graphs (TAGs) included in the topic, as described hereinbelow with reference to FIGS. 4 and 5A-B. For other applications, each topic comprises a simple list, a list of probability-distributed terms, or another data structure.

System 10 uses these topics as coordinates of an N-dimensional vector space, and projects the user profiles onto the space as respective vectors, at a projection step 56. For some applications in which the user profiles comprise personal association graphs (PAGs), as described hereinbelow, the system performs this projection by using the vertices of the PAG of each of the users as respective terms for the projection. For other applications, the system uses the edges of the PAG as the respective terms (i.e., each edge is the combination of two vertices and the edge score, representing an association).

Each of the vectors thus represents a distribution of the respective user over the topics, or, in other words, the strength of the user's interests in the topics. The vectors of users having similar interests are thus projected onto the vector space in proximity to one another, while the vectors of users who do not share common interests are projected onto the space further from one another.

At an interaction step 58, the system models interactions between pairs of the vectors that are in proximity to one another. Typically, the system models the interactions probabilistically rather than deterministically, such that vectors of users having similar interests are more likely to interact with one another than the vectors of users having less similar interests. For example, the system may determine the distance-dependent probability of interaction using a normal distribution, an exponential distribution, or a linear distribution. Alternatively, the system models the interactions deterministically. Based on the interactions, the system modifies the associated user profiles, at a profile modification step 60.

At a content delivery step 62, the system delivers content to at least one of the users using the user's modified profile. For some applications, the content delivered to the user comprises search results generated responsively to a search query and the user's profile, e.g., a personal association graph (PAG), as described hereinbelow with reference to FIG. 3. For example, the system may generate the search results using techniques described in above-mentioned PCT Publication WO 07/124, 430 and/or U.S. patent application Ser. No. 12/253,087 (such as regarding internal search processor 62), in order to rank and order the results based on characteristics of the particular user, one or more communities to which the user belongs, and/or global characteristics of all of the users of the particular deployment of system 10, and/or in the other patent applications incorporated by reference hereinbelow.

For some applications, a search system of system 10 provides personalized search results responsively to associations between search terms and documents returned to a user during previous searches. These associations are represented by the user's profile, e.g., PAG. The use of a PAG enables the search system to return search results to the user ranked at least in part based on search terms not included in a current search query, but which are associated in the user's PAG with search terms included in the current query. Furthermore, the search system extracts relevant terms from documents selected by the user, and adds these to the user's PAG in association with relevant search terms, thereby providing information that helps the system focus future search results.

Alternatively or additionally, the search system provides search results responsively to characteristics of communities to which the user implicitly belongs, as determined by the contribution of the user's PAG to topic profiles of these communities, which typically comprise respective topic association groups (TAGs). Each TAG represents the interactions of a plurality of searches conducted by a plurality of users within a single topic.

For some applications, the users select a desired preference regarding which of these characteristics should be used for ranking, such as by using a sliding pointer, or other means that will be evident to those skilled in the art who have read the present application. Such preferences typically include one or more of a personal-based preference, a community-based preference, and a global-based preference, such as described in the international application.

Alternatively or additionally, the content includes advertisements. For example, the system may use techniques for targeting advertisements described in U.S. application Ser. No. 12/023,564, filed Jan. 13, 2008, which is assigned to the assignee of the present application and is incorporated herein by reference, such as with reference to FIGS. 7A-C thereof. For some applications, system 10 makes a decision regarding which interactive advertisement to present to a user responsively to a comparison of (a) a profile of an internet advertisement and (b) an association graph associated with the user or one or more communities to which the user belongs, such as a PAG, a session association graph, and/or one or more TAGs, and/or one or more hotspots of the PAG, session association graph, or TAGs, derived, for example, using techniques described in above-mentioned PCT Publication WO 07/124,430 and/or U.S. patent application Ser. No. 12/253,087, with reference to FIGS. 10-11 thereof. For some applications, the advertisement profile comprises an advertisement association graph (AAG), as described in the '564 application.

Figure 3:
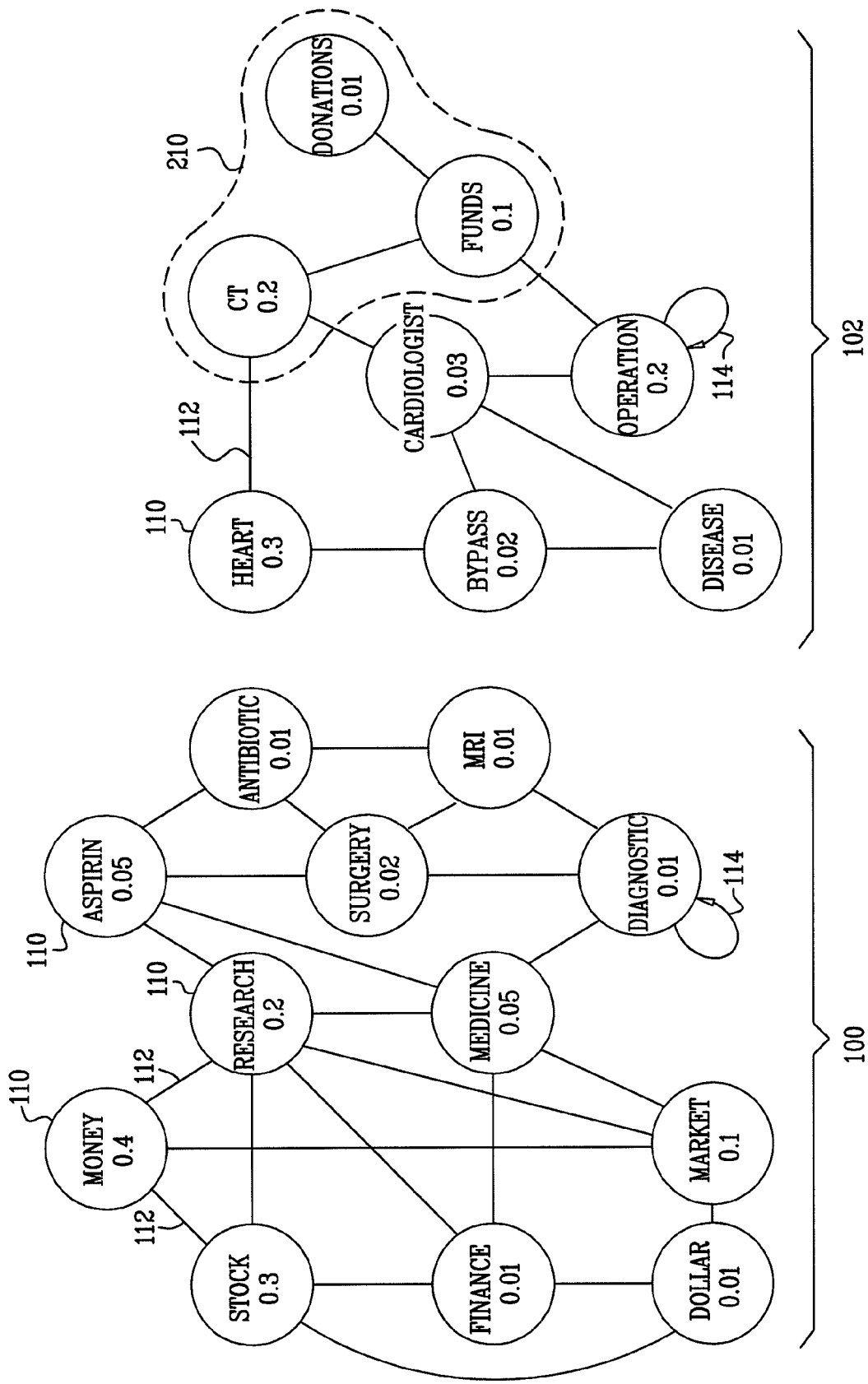
FIG. 3 is a schematic illustration of two exemplary association graphs of two respective users, in accordance with an embodiment of the present invention.

Reference is made to FIG. 3, which is a schematic illustration of two exemplary personal association graphs (PAGs) 100 and 102 of two respective users, in accordance with an embodiment of the present invention. In this embodiment, the user profiles are represented as PAGs. Although exemplary PAGs 100 and 102 include only limited degrees of association, system 10 often develop larger and more complex association graphs, which may include degrees of association greater than two. In general, each PAG represents the interactions of a plurality documents with a single user, such as during one or more searches conducted during one or more search sessions, or during other online interactions of the user.

Each association graph comprises one or more vertices 110, each of which is linked to one or more other vertices by respective edges 112. Furthermore, a vertex may be linked to itself by a self-referential edge 114 in some instances, as described above-mentioned PCT Publication WO 07/124,430 and/or U.S. patent application Ser. No. 12/253,087. In the art, and in the applications assigned to the assignee of the present application that are incorporated hereinbelow by reference, "vertices" are sometimes referred to as "nodes," and "edges" are sometimes referred to as "arcs" or "links." For clarity of presentation, in the present application, including in the claims, a vertex of an association graph including a term is sometimes referred to simply as the term itself. For example, it may be stated that a first term of an association graph is linked to a second term of the association graph, rather than more verbosely stating that a first vertex of an association graph containing a first term is linked to a second vertex of the association graph containing a second term. In FIG. 3, the vertices 110 are labeled with their respective vertex scores, which may be calculated, for example, as a normalized sum of the edge scores of the vertex and any self-referential scores. The use of these vertex scores is described hereinbelow with reference to FIG. 6.

An association graph can be represented visually as a plurality of vertices linked (i.e., connected) by lines representing edges, as shown in FIG. 3, or as an adjacency matrix, as described with reference to FIG. 4 in above-mentioned PCT Publication WO 07/124,430 and/or U.S. patent application Ser. No. 12/253,087. System 10 stores association graphs using one or more data structures. The phrase "association graph," as used herein, including in the claims, includes any data structure that conceptually includes vertices linked by edges, regardless of the nomenclature used to describe the data structure, or how it may be represented, stored, structured, and/or manipulated in memory and/or another storage medium. For some applications, more than one edge links some pairs of vertices. For some applications, the association graph comprises a hypergraph, i.e., a single edge connects more than two vertices. For some applications, the association graph is not directed, i.e., the edges do not include a direction, while for other applications, the association graph is at least partly directed, i.e., at least a portion of the edges include a direction. For some applications, by linking a plurality of directed edges, the search system develops multi-vertex paths of connectivity among vertices.

Each vertex of an associate graph includes a single term, which comprises one or more keywords. Typically, when a term includes a plurality of keywords, the keywords are order-sensitive. Each edge has a score that represents the strength of the association of the vertices linked by the edge. As mentioned above, a vertex may be linked to itself, in which case it has a self-referential score. Association scores are typically, but not necessarily, symmetric, i.e., are not directed.

The PAGs are typically created at user profile construction step 52 of method 50 of FIG. 2 using techniques described in above-mentioned PCT Publication WO 07/124,430 and/or U.S. patent application Ser. No. 12/253,087 with reference to FIGS. 7-9 thereof. For some applications, a feedback processor of system 10 receives an interaction event each time one of users 30 selects a document (often associated with a URL) presented by a search system of system 10 in response to a search query entered by the user. A single interaction event thus represents a single interaction between a single query of a single user 30 and a single selected document. Typically, each document is represented by a snippet that includes one or more of the keywords of the query, and the URL of the document. A search query consists of one or more keywords, and, optionally, operators, such as Boolean operators and quotation marks.

The feedback processor updates the user's PAG with the search terms of the query and a query score, as described hereinbelow. Any search terms not already included to the PAG are added thereto as vertices. The edge scores between the vertices holding the search terms of the query (whether the vertices were already included in the PAG, or newly added) are incremented by an increment value calculated based on the query score.

For some applications, the query score of a given query is dependent upon one or more of the following attributes:
query-specific attributes, such as a measure of the number of keywords in the query, such as the number itself, or the number after subtracting the number of stop words in the query;
user-query-interaction attributes, such as the association score of the query within the user's PAG, or a level of focus of the user regarding the query; and
user-result-interaction attributes, such as a relative position of a selected document in the search results for the query, or an amount of time spent by the user after selecting a document before returning to the same search results to select a subsequent document from the search results.

It is noted that the collection of these attributes by the feedback processor generally does not require any active user participation in generating the query score.

Query-specific attributes characterize aspects of the query that are often positively correlated with the quality of the interaction between the query and the results. These attributes include, but are not limited to:
the number of keywords in the query. In general, more specific queries include a greater number of keywords, and thus are more indicative of a higher quality of interaction between the query and the results; and
the number of stop words in the query (i.e., keywords that are so commonly used that they cannot contribute to relevancy of the query, such as conjunctions, prepositions, and articles). In general, the inclusion of stop words in a query is indicative a low level of user expertise in the topic of the query. Typically, the number of keywords in the number-of-keyword attribute mentioned above is counted after removing stop words.

User-query-interaction attributes characterize aspects of the user's interaction with the query that are often positively correlated with the quality of the interaction between the query and the results. These attributes include, but are not limited to:

the association score of the query within the user's PAG. A higher association score generally correlates with a higher level of user expertise in the topic of the search. The association score is calculated as described hereinbelow and/or using techniques described in above-mentioned PCT Publication WO 07/124,430 and/or U.S. patent application Ser. No. 12/253,087, with reference to FIG. 6 thereof.

a level of focus of the user regarding the query. A focused search within a specific topic is more indicative of a high-quality interaction than a quick search in which the user is just browsing the topic. The level of focus is typically represented by a focal grade, such as described in above-mentioned PCT Publication WO 07/124,430 and/or U.S. patent application Ser. No. 12/253,087.

For some applications, the feedback processor uses the following equation for determining the query score:

$$\text{query score} = \log\left(\frac{(\text{real keyword no.}) \cdot \log(1 + \text{clicked } URL \text{ position})}{(1 + \text{stop words}/2)}\right) \cdot (1 + \text{focal grade}) + 1 \cdot (PAGscore(\text{query}) + 1)$$

(Equation 1)

For some applications, to store association graph 100 in memory 24, system 10 uses the exemplary data structure described with reference to FIG. 5 of above-mentioned PCT Publication WO 07/124,430 and/or U.S. patent application Ser. No. 12/253,087.

Reference is made to FIG. 4, which is a flowchart schematically illustrating a method 150 for identifying topics, in accordance with an embodiment of the present invention. In this embodiment, system 10 uses method 150 to perform topic identification step 54 of method 50, described hereinabove with reference to FIG. 2. As described in detail immediately below, the system identifies hypertopics by combining topic association graphs (TAGs), and these hypertopics serve as the topics identified at topic identification step 54 of method 50. At a hotspot extraction step 152, system 10 extracts one or more hotspots association graphs (generally referred herein simply as a "hotspots") from each of the PAGs, as described in above-mentioned PCT Publication WO 07/124,430 and/or U.S. patent application Ser. No. 12/253,087, with reference to FIGS. 10-11 thereof. A hotspot comprises a portion of a PAG that represents an area of particular importance to the user of the PAG.

Reference is made to FIGS. 5A-B, which show an exemplary topic index 160, in accordance with an embodiment of the present invention. At a topic index construction step 154, system 10 constructs topic index 160 by analyzing hotspots of a plurality of users, as described with reference to FIGS. 7, 8, 12A-B, and 13 of above-mentioned PCT Publication WO 07/124,430. System 10 analyzes the hotspots of a plurality of users 30, such as all users 30 of a particular deployment of system 10, to build topic index 160.

As shown in FIG. 5A, each row of topic index 160 holds (a) a primary index and, optionally, a secondary index, the terms of which are extracted from the hotspots; (b) the user identification code of the user 30 associated with the hotspot; (c) the association score between the vertices of the hotspot holding the terms of the primary and secondary indices; and (d) a list one the IDs of the one or more search results documents that contributed to the entry. The topic index thus serves to cluster related documents via their IDs.

The primary index consists of one more terms, each of which consists of one or more keywords. For example, using data generated from a user 30 having an ID "001" who interacted with documents having the IDs 24, 26, and 123, the first row of topic index 160 indicates that, for user 001, the primary index includes the term "physics," which is linked to the term "engine" of the secondary index by an edge having a score of 70, and the primary and secondary terms have one degree of separation. The second row of topic index 160 indicates that, for a second user having ID "002" who interacted with documents having IDs 25, 27, and 123, the primary index has a term "physics" that is linked to the term "engine" of the secondary index by an edge having a score of 80, and the primary and secondary terms have one degree of separation.

When a term (which may include one or more than one keyword) is first added to the topic index, the term is added as a new primary index. If the term is added without any associated terms, the association score is simply the self-referential score of the term. When a term associated with the term(s) of a primary index in the topic index is added to the topic index from a hotspot (or hotspot difference graph), the new term is added as a secondary index.

For some applications, when a number of entries (each representing a different user) in the topic index containing the same primary and secondary indices crosses a threshold value, the term of the secondary index is combined with the term(s) of the primary index in order to create a multi-term primary index. The association score of the entry is equal to the association score of the terms of the primary index. The secondary index of the term is cleared. FIG. 5B shows the addition of the term "engine" to "physics" in the primary index, because the number of users (including user IDs 001, 002, and 004) reached the threshold value of three. For some applications, system 10 sets the threshold number of users separately for each primary index.

The cleared secondary index is later populated when a term is added to the topic index that is associated with all of the terms of the primary index. Such an additional term is also moved to the primary index when a threshold number of users having the same multi-term primary index also have the same secondary index. A topic index thus generally includes a mix of terms having different degrees of separation. For some applications, system 10 adds tertiary indices to provide second-degree associations even before the respective secondary terms have been promoted to be added to their respective primary indices.

It will be appreciated that the structure of topic index 160 is exemplary only, and that system 10 may use numerous data structures to store, organize, and retrieve the information stored in topic index 160, as will be evident to those skilled in the art who have read the present application.

Reference is again made to FIG. 4. At a TAG creation step 162 of method 150, system 10 analyzes topic index 160 to create and/or update one or more topic association graphs (TAGs). The TAGs represent respective topics in which a plurality of users have expressed, and, for some applications, continue to express, a strong interest. For each primary index of topic index 160 the association score of which crosses a threshold value (for single-term threshold values), or receives multiple terms, as described above with reference to FIG. 5B, the system: (a) creates a topic ID, which consists of the terms of the primary index, (b) adds the topic ID to a topic dictionary, and (c) creates a new TAG for the topic ID. As mentioned above, primary indices sometimes contain a single term (which may include a plurality of keywords), and sometimes contain a plurality of terms (each of which may include a plurality of keywords). System 10 uses the topic dictionary to efficiently access and track topic IDs, without having to extract this information from individual TAGs or the topic index. For some applications, the threshold number of users is set according to a frequency of utilization of the term in searches, e.g., is inversely related to the frequency of utilization. The threshold is thus lower for uncommonly used search terms than commonly used search terms.

In an embodiment of the present invention, each TAG is a summation of all of the hotpots that contributed the topic of the TAG. Alternatively, in another embodiment, each TAG is a summation of all associations within one degree of the topic ID of the TAG within all PAGs that contributed to the topic of the TAG.

System 10 creates a symmetric topic-to-topic weighted adjacency matrix, at a topic-to-topic matrix creation step 164. The system sets the values of the entries of the matrix equal to respective measures of similarity between the respective pairs of TAGs (with values of 1 on the main diagonal). For some applications, the system calculates the measures of similarity by clustering each of the TAGs using a partitioning algorithm, such as a spectral or isoparametric partitioning algorithm, as is known in the art. Each of the clusters represents a sub-topic of the TAG. The system performs respective comparisons of each of the TAGs with all of the other TAGs. To perform each of these comparisons, the system compares each of the clusters of a first one of the TAGs with each of the clusters of a second one of the TAGs. For some applications, the system performs the comparison of the two clusters by finding how much of a first of the two clusters is preserved in the second of the two clusters, i.e., how spread out the terms of the first cluster are in the second cluster. Optionally, the system ranks the clusters within each TAG, and takes this ranking into account when comparing the clusters. Alternatively, the system may perform the comparison of the two clusters by performing a bag-of-words comparison that generates a score for each of the cluster-to-cluster comparisons. The system sums these scores to arrive at a similarity score between the two TAGs. The system uses the similarity scores of all of the TAG-to-TAG comparisons to populate the topic-to-topic matrix.

At an association graph generation step 166, the system represents the topic-to-topic matrix generated at step 164 as an association graph. In the graph, the vertices comprise respective TAGs, and the edge scores are set to the associated TAG-to-TAG scores reflected in the entries of the matrix. At a partitioning step 168, the system finds clusters of TAGs within this association graph by applying a partitioning algorithm to the association graph, such as a spectral or isoparametric partitioning algorithm, as is known in the art (for example, using techniques described in the above-mentioned articles by Dhillon et al. and/or Grady et al.). At a cluster merge step 170, the system merges the TAGs of each of these clusters into respective hypertopic graphs, which serve as the topics identified at topic identification step 54 of method 50.

In an embodiment of the present invention, each topic identified at topic identification step 54 of method 50 comprises exactly one TAG (either a list of all of the words included in the TAG, or the TAG itself, preserving its graph structure). In this embodiment, steps 164 through 170 of method 150 are omitted.

Reference is again made to FIG. 2. As mentioned above, at topic identification step 54 of method 50, system 10 identifies a set of topics that characterize one or more of the user profiles. In accordance with a second technique for identifying topics, system 10 performs latent semantic indexing (LSI) on documents with which users 30 have interacted, e.g., viewed, or another large corpus of relevant documents, using techniques known to those skilled in the art. For example, the system may use techniques described in above-referenced U.S. Pat. No. 7,152,065 to Behrens et al.

In accordance with a third technique for identifying topics, system 10 uses a latent Dirichlet allocation (LDA) model on documents with which users 30 have interacted, e.g., viewed, or another large corpus of relevant documents, using techniques known to those skilled in the art. For example, the system may create a set of tokens, each of which comprises an identifier of a single document, a single term (e.g., keyword), and a score of the term within the document. The system applies the LDA model on the tokens to find a set of topics (a distribution over the terms). The system characterizes each of the documents as a distribution over the topics. It is noted that the words which any given topic comprises do not necessarily appear in the all of the documents characterized by the topic. For some applications, each topic comprises a bag of words identified using the LDA model. For example, LDA analysis techniques may be used that are described in one or more of the above-mentioned articles by Hofmann T, Blei D et al., Griffiths T et al., and/or Steyvers M et al.

Continuing the example of FIG. 3, assume that the topics identified at topic identification step 54 of method 50 include "medicine" and "finance." Further assume that the that the topic "medicine" includes the terms and associated scores shown in the following table (the scores are normalized to have a total of 1; for the sake of brevity, only a portion of the terms are shown):

TABLE 1

| Term | Score |
|---|---|
| medicine | 0.4 |
| disease | 0.2 |
| heart | 0.1 |
| cancer | 0.05 |
| cardiology | 0.05 |
| operation | 0.05 |
| diagnostic | 0.03 |
| antibiotic | 0.03 |
| infection | 0.03 |
| surgery | 0.02 |
| research | 0.02 |
| ... | |
| TOTAL | 1 |

Also assume that the topic "finance" includes the terms and associated scores shown in the following table:

TABLE 2

| Term | Score |
|---|---|
| finance | 0.3 |
| money | 0.2 |
| research | 0.1 |
| stock | 0.1 |
| stock market | 0.1 |
| business | 0.05 |
| funds | 0.05 |
| commerce | 0.02 |
| dollar | 0.02 |
| ... | |
| TOTAL | 1 |

Figure 6:
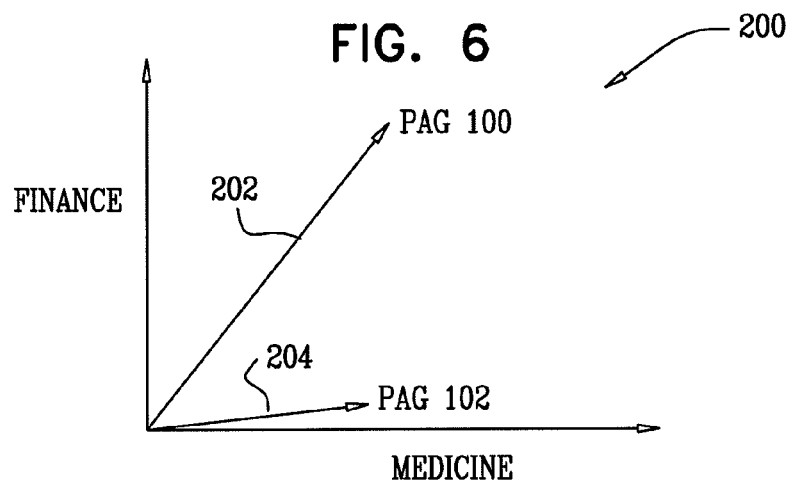
FIG. 6 is a schematic illustration of an exemplary two-dimensional vector space, in accordance with an embodiment of the present invention.

Reference is made to FIG. 6, which is a schematic illustration of an exemplary two-dimensional vector space 200, in accordance with an embodiment of the present invention. Although this example uses only two dimensions, its principles apply equally well to vector spaces having more than two dimensions. Vector spaces in embodiments of the present invention typically have many dimensions. Exemplary vector space 200 uses the two topics mentioned above, "medicine" and "finance," as its coordinates. As described above, at projection step 56 of method 50, system 10 projects the user profiles onto the space as respective vectors. For example, the user profile represented as PAG 100 in FIG. 3 reflects strong interests in medicine and finance, while the user profile represented as PAG 102 reflects a strong interest in medicine, and a weak interest in finance. It is noted that even though the words "medicine" and "finance" do not appear in PAG 102, these topics nevertheless characterize this PAG.

In an embodiment of the present invention, to convert the PAG into a vector, the system sets the value of each of the coordinates (which represent topics) equal to the summation of the products of the vertex scores of the terms of the PAG, as described hereinabove with reference to FIG. 3, and the corresponding values of the terms in the topic. For example, the value of the "finance" coordinate of PAG 100 may be calculated as:

$$\Sigma_i (0.3 \cdot 0.01) + (0.2 \cdot 0.4) + \ldots + (0.02 \cdot 0.01) \quad \text{(Equation 2)}$$

wherein the first product, for example, is of (a) the value of the term "finance" in the "finance" topic, as shown in Table 2 hereinabove, and (b) the vertex score of the term "finance" in PAG 100 shown in FIG. 3 hereinabove.

In another embodiment of the present invention, to convert the PAG into a vector, the system compares each PAG with the respective topic graphs of the coordinates, generated at step 170 of method 150, described hereinabove with reference to FIG. 4. For example, the system may use one of the two techniques described hereinabove for comparing TAGs at step 164 of method 150, with appropriate modifications for comparing each of the PAGs with the topic graphs. Each comparison yields a scalar, which represents the value of the respective coordinate of the vector in the vector space.

The users' respective interests in medicine and finance are represented by vectors 202 and 204, which are shown in vector space 200 of FIG. 6. The vectors of users having similar interests are thus projected onto the vector space in proximity to one another, while the vectors of users who do not share common interests are projected onto the space further from one another.

Figure 7:
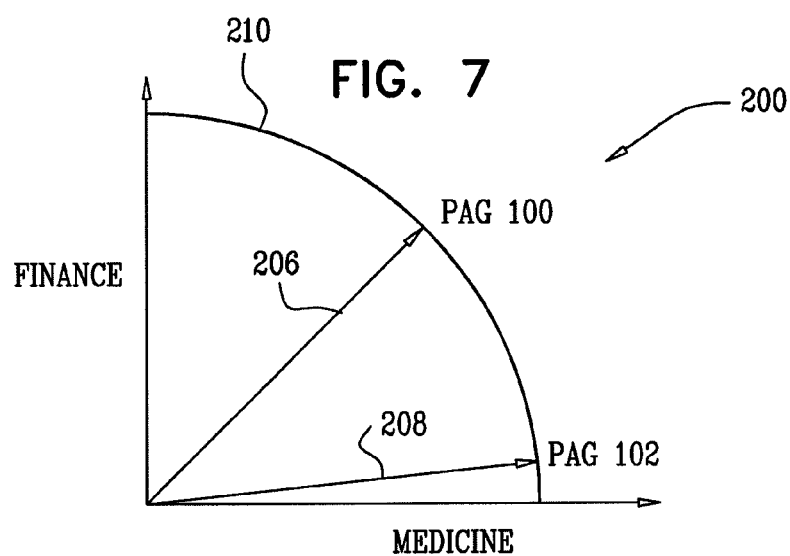
FIG. 7 is a schematic illustration of normalized vectors in the vector space of FIG. 6, in accordance with an embodiment of the present invention.

Reference is made to FIG. 7, which is a schematic illustration of normalized vectors in vector space 200, in accordance with an embodiment of the present invention. The distribution of the vectors within vector space 200, rather than the magnitudes of the vectors, defines the distance between user profiles. Therefore, in this embodiment, at interaction step 58 of method 50, in order to find which vectors are in proximity to one another, system 10 normalizes vectors 202 and 204 of FIG. 6, resulting in normalized vectors 206 and 208, respectively. For some applications, the system performs such normalization by mapping the vectors onto an N-dimensional sphere, which, in the two-dimensional example of FIG. 7, comprises a two-dimensional circle 210. The angle between any two vectors thus defines the distance between the corresponding user profiles.

In an embodiment of the present invention, the system defines a sphere of influence for each user (which may be represented as spheres of influence for the users' respective vectors). The user is able to interact only with other users that fall within the sphere of influence. The spheres of influence are not necessarily symmetric. In other words, if a first user falls within the sphere of influence of a second user, the second user does not necessarily fall within the sphere of influence of the first user. As a result, the first user may be influenced by the second user, but the second user is not necessarily influenced by the first user. Users outside this sphere are too distant to interact. Mathematically, this constraint on interaction is expressed as the rule that users can interact only with other users within a certain angle. For some applications, the system sets the sizes of the spheres of influence in relation to the magnitudes of the respective vectors prior to normalization. This approach mimics real life, in which knowledgeable people (those with high magnitudes in certain areas) tend to influence more people than do less knowledgeable people. Alternatively, each user is assigned the same size sphere of influence.

The probability of two users interacting increases the closer the users' vectors are to one another. In each iteration of the model, each user, via his vector, interacts with one of his nearest neighbors within his sphere of influence. Alternatively, for some applications, a user interacts with more than one other user during an iteration. For some applications, during each iteration of the model, system 10 orders the interactions according to the pre-normalized magnitudes of the vectors, reflecting the greater likelihood of users having the larger vectors to influence rather than be influenced. Each iteration of the model includes an interaction of each of the users with at least one of his neighbors, typically exactly one of his neighbors. The system typically performs numerous iterations of the model, resulting in dynamic learning and sharing of information among users in proximity to one another.

Figure 8:
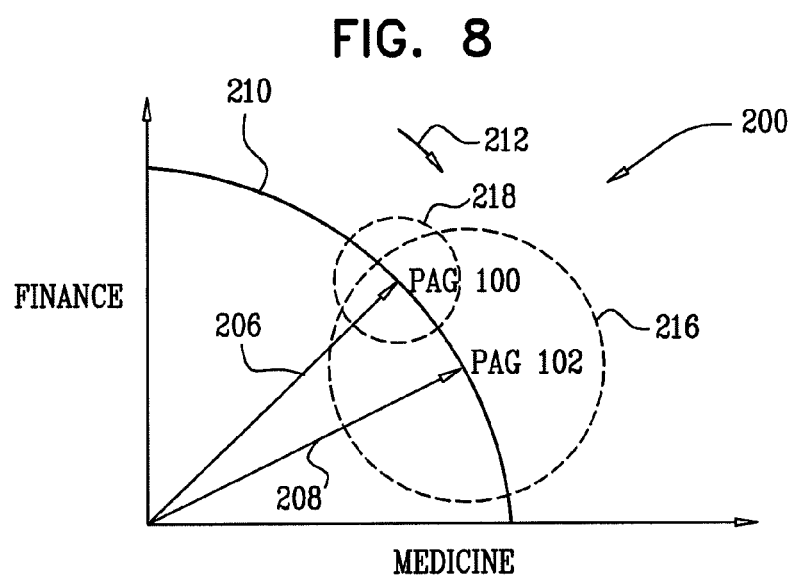
FIG. 8 is a schematic illustration of the interaction of the normalized vectors of FIG. 7 in the vector space of FIG. 6, in accordance with an embodiment of the present invention.

Reference is made to FIG. 8, which is a schematic illustration of the interaction of normalized vectors 206 and 208 in vector space 200, in accordance with an embodiment of the present invention. During each interaction between two users, one or both of the users move closer to each other (such as on a geodesic in N-dimensional space 200). This movement reflects the exchange of influence between the users. In the example shown in FIG. 8, assume that the user represented by PAG 102 and normalized vector 208 falls within a sphere of influence 216 of the user represented by PAG 100 and normalized vector 206. These two users thus interact, causing vector 206 to move closer to vector 208, as symbolically indicated by an arrow 212. For some applications, the distance that each vector moves is inversely related (such as inversely proportional) to its pre-normalized magnitude, i.e., the greater the magnitude of the vector (corresponding to the more influential user), the more the vector pulls the other vector (corresponding to the more influenced user). In this example, normalized vector 208 does not move closer to normalized vector 206, because vector 208 does not fall within a sphere of influence 218 of vector 206 and PAG 100.

Figure 9:
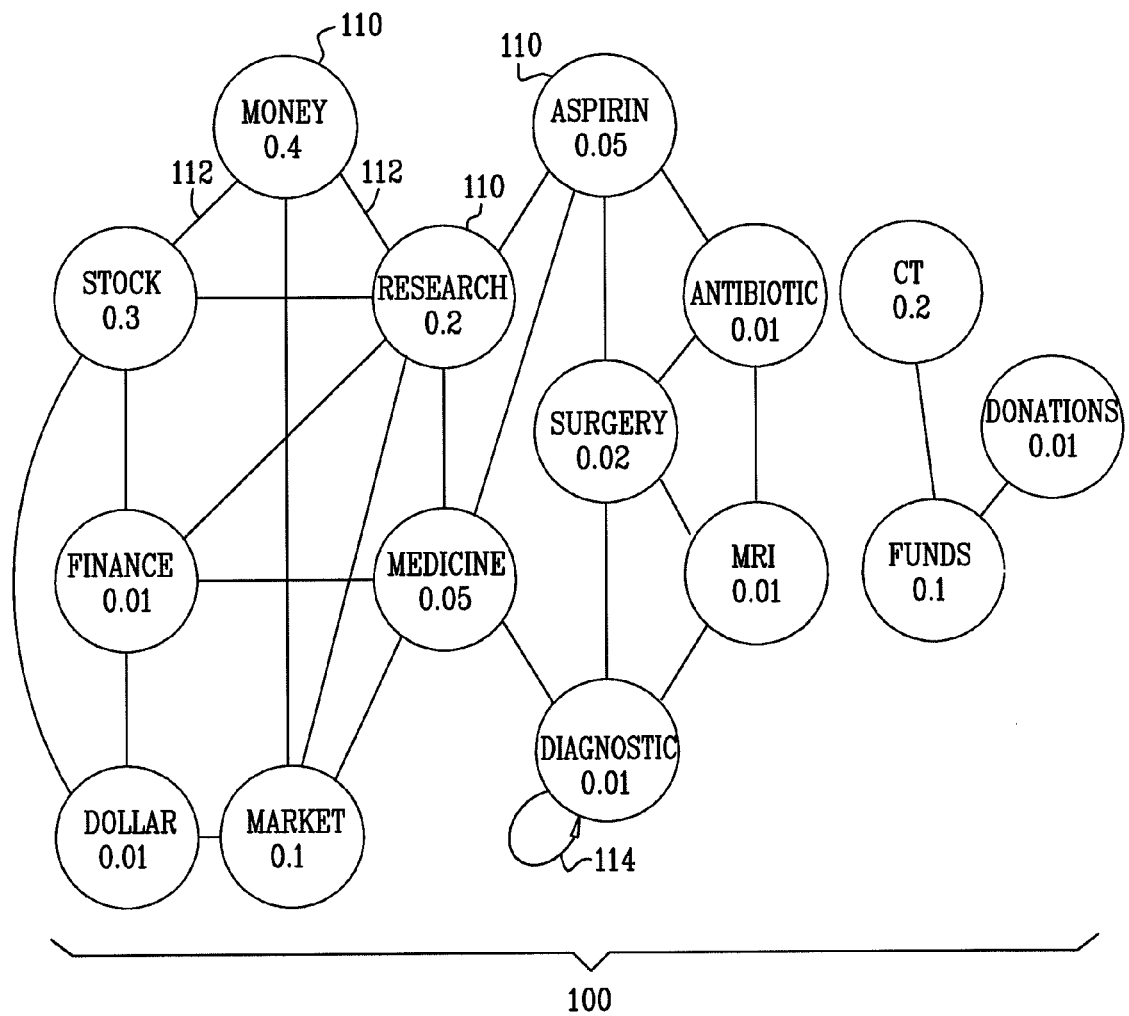
FIG. 9 is a schematic illustration of the exemplary association graphs of FIG. 3, after modification using the method of FIG. 2, in accordance with an embodiment of the present invention.

FIG. 9 is a schematic illustration of exemplary association graph 100 of FIG. 3, after modification at profile modification step 60 of method 50, described hereinabove with reference to FIG. 2, in accordance with an embodiment of the present invention. For some applications, the relative movement of vector 206 described hereinabove with reference to FIG. 8 translates into a transfer of information from PAG 102 to PAG 100, by transferring a hotspot 210 of PAG 102 (the hotspot is shown in FIG. 3) to PAG 100, typically with the scores of the hotspot damped. (In the example shown in FIG. 9, PAG 100 gains no information from PAG 102, because normalized vector 208 of PAG 102 does not fall within sphere of influence 218 of normalized vector 206 of PAG 100.) Such transfer of information includes both adding new terms to the graphs (such as "CT," "donations, and "funds"), and influencing edge scores of existing terms (not shown in this example). Typically, if the information to be transferred includes a term already present in the PAG, the score of the vertex and/or edge scores of the term in the PAG are increased. Links among terms in the information to be added are typically preserved as the terms are transferred to the PAG.

For some applications, the system does not perform profile modification step 60 of method 50, described hereinabove with reference to FIG. 2. Instead, the relative movements of the vectors described hereinabove with reference to FIG. 8 directly affect future online interactions of the users, such as the ranking of search results. For example, the vector movement, which reflects a change in distribution of a user's interests in the topics that define the vector space, may cause the user to have a different distribution function over LDA topics.

In an embodiment of the present invention, the system provides a low, but non-zero, probability of interaction between any two users, even if they are outside one another's spheres of influence (e.g., completely dissimilar). Such interactions add noise and uncertainty to the model, similarly to everyday social interactions in which in certain cases even unlike-minded people find common ground to communicate and exchange knowledge.

Figure 10:
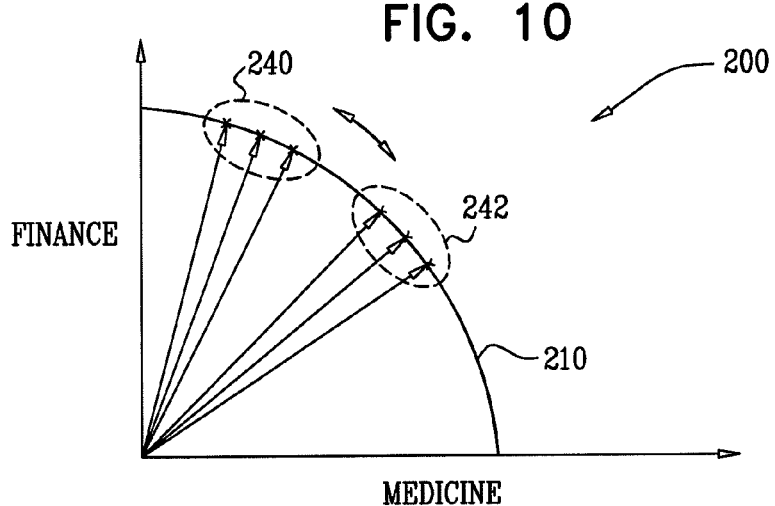
FIG. 10 is a schematic illustration of the interaction of two vector clusters in a vector space, in accordance with an embodiment of the present invention.

Reference is made to FIG. 10, which is a schematic illustration of the interaction of vector clusters 240 and 242 in vector space 200, in accordance with an embodiment of the present invention. In general, individual local interactions of each user within his sphere of influence results in the formation of clusters of users (communities). Communities of like-minded users tend to polarize if their interests are very different (if they are far from one another in the vector space), or converge if the interests are relatively similar. For example, as shown in FIG. 10, the vectors representing users' profiles may converge into first vector cluster 240 and second vector cluster 242.

In this embodiment of the present invention, system 10 treats each vector cluster as a single entity, which interacts as a unit with other vector clusters and/or individual vectors. In order to treat each vector cluster as a single entity, the system typically represents the vector cluster by its centroid, identified, for example, using the k-means algorithm, as is known in the art. When, during an interaction, as described hereinabove with reference to FIG. 8, a cluster moves with respect to another cluster or vector, the system moves along the component vectors of the cluster, maintaining their relationship with the centroid. For some applications, the movement of users in the vector space is translated to a change in the users' respective personal profiles, as described hereinabove with reference to FIG. 9. For example, one or more hotspots of the influencing users may be merged and the scores thereof damped, and the merged hotspots with damped scores added to the PAGs of the influenced users. Alternatively, the relative movements of the vectors directly affect future online interactions of the users, such as the ranking of search results, as described above with reference to FIG. 9 for individual vector movements. This clustering approach tends to add greater complexity to the model, and to drive the model away from equilibrium. This movement of clusters occurs along with the iterative movement of individual users within their local surroundings, as described hereinabove.

In some embodiments of the present invention, system 10 uses profiles that do not comprise association graphs, such as lists (e.g., ranked lists), vectors, sets of sets, and a non-associative multi-dimensional matrix (e.g., three or more dimensions). For example, the system may use personal profiles that do not comprise PAGs or session association graphs, and/or topic profiles that do not comprise TAGs.

The word "document," as used in the present application, including the claims, is to be understood broadly as referring to any digital unit of information, including, but not limited to, files (e.g., containing text, media, or hyperlinks), Web pages, newsgroup postings, and e-mails, which can be stored electronically on a computer or a network.

Techniques of embodiments of the present invention may improve the efficiency of searching, and conserve the use of computer resources.

Embodiments of the present invention described herein can take the form of an entirely hardware embodiment, an entirely software embodiment or an embodiment including both hardware and software elements. In an embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Typically, the operations described herein that are performed by system 10 transform the physical state of memory 24, which is a real physical article, to have a different magnetic polarity, electrical charge, or the like depending on the technology of the memory that is used.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. The system can read the inventive instructions on the program storage devices and follow these instructions to execute the methodology of the embodiments of the invention.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Computer program code for carrying out operations of the present invention may be written in any combination of one or more programming languages, including an object oriented programming language such as Java, Smalltalk, C++ or the like and conventional procedural programming languages, such as the C programming language or similar programming languages.

It will be understood that each block of the flowcharts shown in FIGS. 2 and 4, and combinations of blocks in the flowchart, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart blocks.

The scope of the present invention includes embodiments described in the following applications, which are assigned to the assignee of the present application and are incorporated herein by reference. In an embodiment, techniques and apparatus described in one or more of the following applications are combined with techniques and apparatus described herein:

International Patent Application PCT/U.S. Ser. No. 07/67,103, filed Apr. 20, 2007, entitled, "Search techniques using association graphs," which published as International Publication WO 07/124,430 to Ismalon;

U.S. patent application Ser. No. 11/633,461, filed Dec. 5, 2006, entitled, "A multi-directional and auto-adaptive relevance and search system and methods thereof";

U.S. Provisional Patent Application 60/793,253, filed Apr. 20, 2006, entitled, "Methods for using association graphs in search engines";

U.S. Provisional Patent Application 60/796,188, filed May 1, 2006, entitled, "Apparatus and methods thereof for search engine personalization";

U.S. Provisional Patent Application 60/829,136, filed Oct. 11, 2006, entitled, "Apparatus and methods thereof for search phrase refinement";

U.S. Provisional Patent Application 60/829,135, filed Oct. 11, 2006, entitled, "Apparatus and methods thereof for using explicit query refinements to tune search results ranking factors";

U.S. Provisional Patent Application 60/829,132, filed Oct. 11, 2006, entitled, "Apparatus and methods thereof for adaptive ranking mechanism using association graphs and contextual analysis";

U.S. Provisional Patent Application 60/886,193, filed Jan. 23, 2007, entitled, "Multi-directional and auto-adaptive relevance and search system and methods thereof";

U.S. Provisional Patent Application 60/887,580, filed Jan. 31, 2007, entitled, "Searchable banner display and apparatus that enables exploring destination content prior to reaching it";

U.S. Provisional Patent Application 60/741,902, filed in January 2006, entitled, "A multi-directional and auto-adaptive relevance and search system and methods thereof";

U.S. patent application Ser. No. 11/846,213, filed Aug. 28, 2007, entitled, "Search phrase refinement by search term replacement";

U.S. patent application Ser. No. 11/870,999, filed Oct. 11, 2007, entitled, "Negative associations for search results ranking and refinement";

U.S. patent application Ser. No. 12/023,564, filed Jan. 31, 2008, entitled, "Searchable interactive internet advertisements";

U.S. patent application Ser. No. 12/397,510, filed Mar. 4, 2009, entitled, "Optimization of social distribution networks"; and U.S. patent application Ser. No. 12/253,087, filed Oct. 16, 2008, entitled, "Techniques for ranking search results."

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A computer-implemented method comprising:
constructing, by a computer system, first and second user profiles for respective first and second users, by observing respective online behaviors of the first and second users;
projecting, by the computer system, the first and second user profiles onto an N-dimensional vector space as respective first and second vectors;
modeling, by the computer system, an interaction between the first and second vectors in the vector space, during which modeled interaction both the first vector moves closer to the second vector and the second vector moves closer to the first vector in the vector space;
responsively to the modeled interaction, modifying, by the computer system, the first user profile; and
presenting content to the first user responsively to the modified first user profile.

2. The method according to claim 1, wherein modifying the first user profile comprises transferring information from the second user profile to the first user profile.

3. The method according to claim 1, wherein modifying the first user profile comprises modifying both the first user profile and the second user profile responsively to the modeled interaction.

4. The method according to claim 1, wherein projecting comprises identifying one or more topics, and using the topics as coordinates of the vector space, and wherein the first and second vectors represent respective strengths of interest of the first and second users in the topics.

5. The method according to claim 4, wherein the one or more topics are represented as respective topic association graphs (TAGs), each of which includes a plurality of vertices, each of which vertices is linked to one or more other vertices by respective edges.

6. The method according to claim 1, wherein modeling the interaction comprises defining a sphere of influence for the second user, and wherein modifying comprises modifying the first user profile only upon finding that the first user falls within the sphere of influence of the second user.

7. The method according to claim 1, wherein modeling the interaction comprises probabilistically modeling the interaction between the first and second vectors.

8. The method according to claim 1, wherein presenting the content comprises presenting search results to the first user responsively to the modified first user profile and a search query received from the first user.

9. The method according to claim 1, wherein presenting the content comprises presenting an online advertisement to the first user responsively to the modified first user profile.

10. The method according to claim 1, wherein the first and second user profiles are represented as respective personal association graphs (PAGs), each of which includes a plurality of vertices, each of which vertices is linked to one or more of the other vertices by respective edges.

11. The method according to 1, wherein modeling the interaction and modifying the first user profile comprise modeling the interaction and modifying the first user profile upon identifying, by the computer system, that the first and second users have similar interests.

12. The method according to claim 1, wherein observing the respective online behaviors of the first and second users comprises observing respective selections of respective search result documents from respective sets of search results presented to the first and second users in response to respective search queries.

13. The method according to claim 1, wherein modeling comprises modeling the interaction upon finding that the first and second vectors are in proximity to one another in the vector space.

14. Apparatus comprising:
an interface; and
a processor, configured to construct first and second user profiles for respective first and second users, by observing, via the interface, respective online behaviors of the first and second users, to project the first and second user profiles onto an N-dimensional vector space as respective first and second vectors, to model an interaction between the first and second vectors in the vector space, during which modeled interaction both the first vector moves closer to the second vector and the second vector moves closer to the first vector in the vector space, to modify, responsively to the modeled interaction, the first user profile, and to present, via the interface, content to the first user responsively to the modified first user profile.

15. The apparatus according to claim 14, wherein the processor is configured to modify the first user profile by transferring information from the second user profile to the first user profile.

16. The apparatus according to claim 14, wherein the processor is configured to modify both the first user profile and the second user profile responsively to the modeled interaction.

17. The apparatus according to claim 14, wherein the processor is configured to project by identifying one or more topics, and using the topics as coordinates of the vector space, and wherein the first and second vectors represent respective strengths of interest of the first and second users in the topics.

18. The apparatus according to claim 17, wherein the one or more topics are represented as respective topic association graphs (TAGs), each of which includes a plurality of vertices, each of which vertices is linked to one or more other vertices by respective edges.

19. The apparatus according to claim 14, wherein the processor is configured to model the interaction by defining a sphere of influence for the second user, and modifying the first user profile only upon finding that the first user falls within the sphere of influence of the second user.

20. The apparatus according to claim 14, wherein the processor is configured to probabilistically model the interaction between the first and second vectors.

21. The apparatus according to claim 14, wherein the content includes search results, and wherein the processor is configured to present the search results to the first user, via the interface, responsively to the modified first user profile and a search query received from the first user.

22. The apparatus according to claim 14, wherein the content includes an online advertisement, and wherein the processor is configured to present the online advertisement to the first user, via the interface, responsively to the modified first user profile.

23. The apparatus according to claim 14, wherein the first and second user profiles are represented as respective personal association graphs (PAGs), each of which includes a plurality of vertices, each of which vertices is linked to one or more of the other vertices by respective edges.

24. The apparatus according to 14, wherein the processor is configured to model the interaction and modify the first user profile upon identifying that the first and second users have similar interests.

25. The apparatus according to claim 14, wherein the processor is configured to observe the respective online behaviors of the first and second users by observing respective selections of respective search result documents from respective sets of search results presented to the first and second users in response to respective search queries.

26. The apparatus according to claim 14, wherein the processor is configured to model the interaction upon finding that the first and second vectors are in proximity to one another in the vector space.

27. A computer software product, comprising a non-transitory tangible computer-readable medium in which program instructions are stored, which instructions, when executed by a computer, cause the computer to construct first and second user profiles for respective first and second users, by observing respective online behaviors of the first and second users, to project the first and second user profiles onto an N-dimensional vector space as respective first and second vectors, to model an interaction between the first and second vectors in the vector space, during which modeled interaction both the first vector moves closer to the second vector and the second vector moves closer to the first vector in the vector space, to modify, responsively to the modeled interaction, the first user profile, and to present content to the first user responsively to the modified first user profile.

28. The product according to claim 27, wherein the instructions cause the computer to modify the first user profile by transferring information from the second user profile to the first user profile.

29. The product according to claim 27, wherein the instructions cause the computer to modify both the first user profile and the second user profile responsively to the modeled interaction.

30. The product according to claim 27, wherein the instructions cause the computer to project by identifying one or more topics, and using the topics as coordinates of the vector space, and wherein the first and second vectors represent respective strengths of interest of the first and second users in the topics.

31. The product according to claim 30, wherein the one or more topics are represented as respective topic association graphs (TAGs), each of which includes a plurality of vertices, each of which vertices is linked to one or more other vertices by respective edges.

32. The product according to claim 27, wherein the instructions cause the computer to model the interaction by defining a sphere of influence for the second user, and modifying the first user profile only upon finding that the first user falls within the sphere of influence of the second user.

33. The product according to claim 27, wherein the instructions cause the computer to probabilistically model the interaction between the first and second vectors.

34. The product according to claim 27, wherein the content includes search results, and wherein the instructions cause the computer to present the search results to the first user responsively to the modified first user profile and a search query received from the first user.

35. The product according to claim 27, wherein the content includes an online advertisement, and wherein the instructions cause the computer to present the online advertisement to the first user responsively to the modified first user profile.

36. The product according to claim 27, wherein the first and second user profiles are represented as respective personal association graphs (PAGs), each of which includes a plurality of vertices, each of which vertices is linked to one or more of the other vertices by respective edges.

37. The product according to 27, wherein the instructions cause the computer to model the interaction and modify the first user profile upon identifying that the first and second users have similar interests.

38. The product according to claim 27, wherein the instructions cause the computer to observe the respective online behaviors of the first and second users by observing respective selections of respective search result documents from respective sets of search results presented to the first and second users in response to respective search queries.

39. The product according to claim 27, wherein the instructions cause the computer to model the interaction upon finding that the first and second vectors are in proximity to one another in the vector space.

* * * * *